United States Patent

Fujioka

[11] Patent Number: 5,861,884
[45] Date of Patent: *Jan. 19, 1999

[54] METHOD AND SYSTEM MANAGING INFORMATION INDICATING HOW PREDETERMINED INFORMATION HAS BEEN USED

[75] Inventor: Susumu Fujioka, Zama, Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 570,477

[22] Filed: Dec. 11, 1995

[30] Foreign Application Priority Data

Dec. 15, 1994 [JP] Japan .................................. 6-332931
Mar. 31, 1995 [JP] Japan .................................. 7-153785

[51] Int. Cl.$^6$ .............................. G06F 3/00; G06F 15/18
[52] U.S. Cl. ......................... 345/338; 345/337; 345/329
[58] Field of Search ......................... 395/338, 337, 395/336, 329, 331, 332, 971, 333; 345/338, 337, 336, 329, 331, 332, 971, 333; 434/118

[56] References Cited

U.S. PATENT DOCUMENTS

| | | | |
|---|---|---|---|
| 4,964,077 | 10/1990 | Eisen et al. .............................. | 345/337 |
| 5,086,393 | 2/1992 | Kerr et al. .......................... | 434/118 X |
| 5,377,317 | 12/1994 | Bates et al. .......................... | 345/336 X |
| 5,448,695 | 9/1995 | Douglas et al. .................... | 345/338 X |
| 5,537,618 | 7/1996 | Boulton et al. ..................... | 434/118 X |

FOREIGN PATENT DOCUMENTS 2-186417 of 1990 Japan .

OTHER PUBLICATIONS

Copy of CCITT recommendation, Q.931.

*Primary Examiner*—Raymond J. Bayerl
*Attorney, Agent, or Firm*—Dickstein Shapiro Morin & Oshinsky LLP

[57] ABSTRACT

History information indicating a history of how respective items of help information have been displayed in a data processing apparatus is formed and stored. A function of outputting a list of the history information is provided. A center data processing apparatus collects, via a communications network, such history information from one or many user data processing apparatuses which the center apparatus manages. This collection is achieved either in response to the center apparatus sending a request or by a function of each user apparatus such that each user apparatus automatically sends the history information to the center apparatus periodically. The thus-collected history information is integrated and thus numbers of times of display of help information are summed for every item of history information or for every item of operation guidance information. Instead, the thus-collected history information may be individually stored.

15 Claims, 26 Drawing Sheets

| APPLICATION NAME | ID | EXECUTION STATE | HELP DATA TYPE | NUMBER OF TIMES HELP FUNCTION USED |
|---|---|---|---|---|
| TW | 0010 | B | B - H1 | 3 |
| | | | B - H2 | 5 |
| | | | B - H3 | 2 |
| TW | 0010 | C | C - H1 | 2 |
| G4FAX | 0015 | S | S - H1 | 1 |
| | | | S - H2 | 2 |
| REP. DISP/ | 0030 | G | G - H1 | 3 |
| | | | G - H2 | 1 |
| | | | G - H3 | 1 |
| ⋮ | ⋮ | ⋮ | ⋮ | ⋮ |

FIG.4

| APPLICATION NAME | ID | EXECUTION STATE | HELP DATA TYPE | NUMBER OF TIMES HELP FUNCTION USED |
|---|---|---|---|---|
| TW | 0010 | B | B-H1 | 3 |
| | | | B-H2 | 5 |
| | | | B-H3 | 2 |
| TW | 0010 | C | C-H1 | 2 |
| G4FAX | 0015 | S | S-H1 | 1 |
| | | | S-H2 | 2 |
| REP. DISP/ | 0030 | G | G-H1 | 3 |
| | | | G-H2 | 1 |
| | | | G-H3 | 1 |
| --- | --- | --- | --- | --- |

FIG. 5A

| BY-USER HELP STATISTICS DATA #1 | BY-USER HELP STATISTICS DATA #2 | ---- | BY-USER HELP STATISTICS DATA #N |
|---|---|---|---|

FIG. 5B

| USER ID | TELEPHONE NUMBER | TEMPORARY REGION | HISTORY REGION |
|---|---|---|---|

FIG. 15

| APPLICATION NAME | ID | GUIDANCE TYPE | HELP USE TIME NUMBER |
|---|---|---|---|
| TW | 0010 | B | 10 |
| TW | 0010 | C | 2 |
| G4 FAX | 0015 | S | 3 |
| REP. DISPI | 0030 | G | 5 |
| --- | --- | --- | --- |

FIG. 18

| APPLICATION NAME | ID | EXECUTION STATE | HELP DATA TYPE | NUMBER OF TIMES HELP FUNCTION USED |
|---|---|---|---|---|
| TW | 0010 | B | B-H1 | 3 |
| | | | B-H2 | 5 |
| | | | B-H3 | 2 |
| TW | 0010 | C | C-H1 | 2 |
| G4FAX | 0015 | S | S-H1 | 1 |
| | | | S-H2 | 2 |
| REP. DISP/ | 0030 | G | G-H1 | 3 |
| | | | G-H2 | 1 |
| | | | G-H3 | 1 |
| --- | --- | --- | --- | --- |

FIG. 20B

| USER ID | TELEPONE NUMBER | HISTORY REGION |

FIG. 20A

| BY-USER HELP STATISTICS DATA #1 | BY-USER HELP STATISTICS DATA #2 | ----- | BY USER HELP STATISTICS DATA #N |

FIG. 22

[ USER ID : 0005   TELEPHON NUMBER : 03-222-1234 ]

| APPLICATION NAME | ID | EXECUTION STATE | HELP DATA TYPE | NUMBER OF TIMES HELP FUNCTION USED |
|---|---|---|---|---|
| TW | 0010 | B | B-H1 | 3 |
| | | | B-H2 | 5 |
| | | | B-H3 | 2 |
| TW | 0010 | C | C-H1 | 2 |
| G4FAX | 0015 | S | S-H1 | 1 |
| | | | S-H2 | 2 |
| REP. DISP/ | 0030 | G | G-H1 | 3 |
| | | | G-H2 | 1 |
| | | | G-H3 | 1 |
| --- | --- | --- | --- | --- |

FIG. 23

| APPLICATION NAME | ID | EXECUTION STATE | HELP DATA TYPE | NUMBER OF TIMES HELP FUNCTION USED |
|---|---|---|---|---|
| TW | 0010 | B | B-H2 | 5 |
| REP. DISP/ | 0030 | G | B-H1 | 3 |
| TW | 0010 | B | G-H1 | 3 |
| TW | 0010 | C | B-H3 | 2 |
| G4 FAX | 0015 | S | C-H1 | 2 |
| REP. DISP/ | 0030 | G | S-H2 | 1 |
|  |  |  | S-H1 | 1 |
|  |  |  | G-H2 | 1 |
| --- | --- | --- | G-H3 | --- |

FIG. 24

[USER ID : 0005   TELEPHONE NUMBER : 03-222-1234]

| APPLICATION NAME | ID | EXECUTION STATE | HELP DATA TYPE | NUMBER OF TIMES HELP FUNCTION USED |
|---|---|---|---|---|
| TW | 0010 | B | B-H2 | 5 |
| REP. DISPI | 0030 | G | B-H1 | 3 |
| TW | 0010 | B | G-H1 | 3 |
| TW | 0010 | C | B-H3 | 2 |
| G4 FAX | 0015 | S | C-H1 | 2 |
| REP. DISPI | 0030 | G | S-H2 | 1 |
| | | | S-H1 | 1 |
| | | | G-H2 | 1 |
| --- | --- | --- | G-H3 | --- |

METHOD AND SYSTEM MANAGING INFORMATION INDICATING HOW PREDETERMINED INFORMATION HAS BEEN USED

BACKGROUND OF THE INVENTION

1. Field of the Invention

The present invention relates to a method and a system managing information indicating how predetermined information has been used, in particular, to a method and a system managing information indicating how help information has been used.

There are data processing apparatus and communications terminal apparatus which have a well-known help function. The help function will now be described. For example, if a user of a relevant apparatus having the help function wishes to know how to use the apparatus, the user may input a predetermined help-information supply request: For example, the user may manipulate a specific help key provided on the apparatus. The help key may be either an actual key as a part of hardware or a virtual key realized by a software program. In response to the key manipulation, the apparatus automatically selects a set of help information, from among previously stored sets of help information, appropriate for a current internal state of the apparatus. The apparatus then displays the thus-selected set of help information indicating how to use the apparatus.

Japanese Laid-Open Patent Application No. 2186417 discloses a help information control method and apparatus managing help data in a manner in which help data is relevant to execution states of application programs.

By using the help function, the user can obtain information for manipulating the apparatus and thus appropriately use even complicated functions of the apparatus. For this purpose, the apparatus previously stores therein the sets of help information so that a set of help information, appropriate for a current internal state of the apparatus, may be selected from among the sets of help information in response to the help-information supply request being input.

Further, the help function may supply help information while the apparatus is displaying previously stored operation guidance information of the apparatus. The operation guidance information is automatically displayed on a screen of the apparatus as a temporary screen and indicates how to manipulate the apparatus, for example, how to press a certain operation key, while a predetermined data processing operation is being performed.

In such a case, the help information explains contents of an item of the operation guidance information currently being displayed. For this purpose, the apparatus previously stores therein the sets of help information so that a set of help information, appropriate for an item of the operation guidance information currently being displayed, may be selected from among the sets of help information in response to the help-information supply request being input.

2. Description of the Related Art

An apparatus having the help function stores a plurality of sets of help information appropriate for a single internal state of the apparatus. Thereby, the user may obtain various information, for manipulating the apparatus, relevant to the current internal state of the apparatus which may include a particular item of help information which the user actually wishes to obtain. In response to the help-information supply request being input, the apparatus displays the plurality of sets of help information one by one according to a predetermined display order.

The predetermined display order is ordinarily determined by a designer of the apparatus during a stage in which the apparatus is being designed. The predetermined display order may not be one precisely appropriate for an actual user's demand. Thus, the user may wait, for long time, for a particular item of help information which the user actually wishes to obtain while the plurality of sets of help information are being displayed one by one according to the predetermined display order. Thus, the help function may not always be convenient for the user.

Instead of supplying the plurality of sets of help information one by one in the predetermined display order, a brief list of the plurality of sets of help information may be first displayed. Then, the user may select a set therefrom. In such a case, an excessive time may be required for the user to locate a relevant set of help information, due to causes that, for example, the list includes too many items and/or a description of each item in the list is too broad to understand contents thereof easily. Further, the plurality of sets of help information may include ones which are not actually necessary for users.

Further, there is a case where the help function supplies help information explaining contents of an item of previously stored operation guidance information currently being displayed as mentioned above. In this case, the previously stored operation guidance information is ordinarily produced by a designer of the apparatus during a stage in which the apparatus is being designed. However, it is difficult for the designer to produce the operation guidance information precisely appropriate for an actual user's demand. Therefore, the thus-produced operation guidance information may not be one precisely appropriate for the actual user's demand. As a result, the user may not sufficiently understand the operation guidance information and thus may frequently require a display of help information further explaining the operation guidance information.

SUMMARY OF THE INVENTION

An object of the present invention is to provide a method and a system managing information indicating how predetermined information, in particular, help information, has been used, by which a predetermined display order of a plurality of sets of help information may be modified appropriately. Thus, a particular item of help information which a user actually wishes to obtain is included in a set of help information, among the plurality of sets of help information, which set is displayed earlier while the plurality of sets of help information are being displayed according to the thus-modified display order. Therefore, it is possible to reduce a time required for the user to obtain a particular item of help information while the plurality of sets of help information are being displayed one by one.

Another object of the present invention is to provide a method and a system managing information indicating how predetermined information, in particular, help information, has been used, by which a list of a plurality of sets of help information may be improved and thus a time required for a user to locate a set from among the plurality of sets of help information on the list may be reduced.

Another object of the present invention is to provide a method and a system managing information indicating how predetermined information, in particular, help information, has been used, by which previously stored operation guidance information may be modified appropriately. Thus, the operation guidance information becomes information which a user may understand well and thus the user does not require a display of help information very frequently. Therefore, it is possible to lower a frequency of the user requiring a display of help information explaining contents of the operation guidance information.

In order to achieve the objects, history information indicating a history as to how respective items of the help information have been displayed is formed and stored. By using this history information, the display order of items of help information may be modified so as to make it appropriate for an actual user's demand or the contents of the operation guidance information may be effectively improved. As a result, manipulation of the relevant data processing apparatus may become easier because an actually desired item of help information is displayed first or earlier.

It is preferable that a function of outputting a list of the history information is provided. By using the list, the history is easily, rapidly understood.

Further, it is preferable that a center apparatus collects, via a communications network, such history information from one or many user apparatuses which the center apparatus manages. This collection may be achieved either in response to the center apparatus sending a request or by a function of each user apparatus such that each user apparatus automatically sends the history information to the center apparatus periodically. Thereby, the center apparatus can easily know the history in a remote user apparatus. Further, the center apparatus can easily know the history of many user apparatuses. As a result, improvement of the display order of the help information and the contents of operation guidance information may be effectively performed.

Further, it is preferable that the history information collected by the center apparatus from the many user apparatuses is effectively displayed.

Specifically, the thus-collected history information may be integrated and thus numbers of times of display of help information are summed for every item of history information or for every item of operation guidance information. Thereby, it is possible to know a general tendency as to how respective items of help information have been used.

Further, instead, the thus-collected history information may be individually stored. Thereby, it is possible to know individual tendencies as to how respective items of help information have been used in respective user apparatuses. Such individual-user-apparatus history information may then be used for producing statistics in various manners. For example, by knowing which kinds (ages, occupational categories, or the like) of customers use respective user apparatuses, it is possible to provide different display orders or different contents of operation guidance information for different kinds of customers who actually use respective user apparatuses. As a result, an effective commercial strategy of data processing apparatuses may be made.

Further, it is preferable that a function is provided of sorting the history information so that an item of the history information, relevant to an item of the help information which has been displayed more frequently, be at a higher order. Thereby, which items of the help information are frequently used is easily, rapidly known. Thus, convenience in management of the history information is improved.

Other objects and further features of the present invention will become more apparent from the following detailed description when read in conjunction with the accompanying drawings.

BRIEF DESCRIPTION OF THE DRAWINGS

FIG. 4 shows an example of a help statistic table of a user apparatus in the first embodiment;

FIGS. 5A and 5B show an example of individual-user help statistics data in a center apparatus in the first embodiment;

FIG. 15 shows another example of the help statistics table which the user apparatus has;

FIG. 18 shows an example of the help statistics table of a sample user apparatus in the second embodiment, an example of a user-integrated help statistics table of the center apparatus, and the help statistics table as a format of a history region of by-user help statistics data included in a individual-user help statistics table;

FIGS. 20A and 20B show an example of an individual-user help statistics table of the center apparatus in the second embodiment;

FIG. 22 shows an example of the help statistics data to be displayed in the operation shown in FIG. 21;

FIGS. 23 and 24 show the help statistics data resulting from performing a sorting operation on the help statistics data shown in FIGS. 18 and 22, respectively.

DESCRIPTION OF PREFERRED EMBODIMENTS

Figure 1:
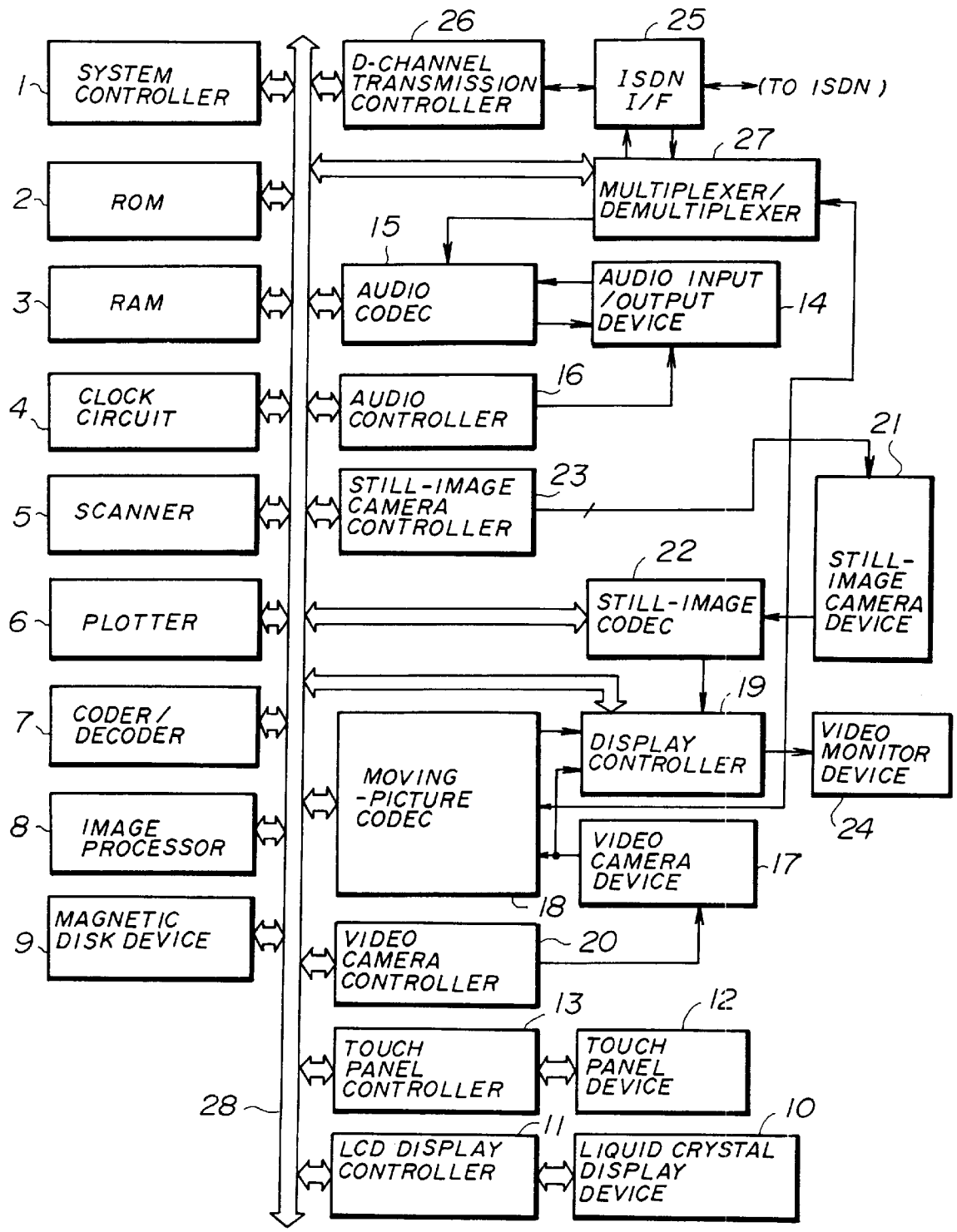
FIG. 1 shows a block diagram of a video-conference communications terminal apparatus in a first embodiment of the present invention.

With reference to FIG. 1, a video-conference communications terminal apparatus in a first embodiment of the present invention will now be described. The video-conference communications terminal apparatus uses a basic interface of ISDN as a transmission path. This terminal apparatus has a function of communicating audio information, a function of communicating moving-picture information, a function of communicating still-picture information, a facsimile-communications function, a tele-writing function, and a function of communicating information by multiplexing these communications functions. Further, the terminal apparatus can perform data communications using two information channels (B-channels) as a result of being connected to the basic interface of ISDN.

In FIG. 1, a system controller 1 performs various kinds of control operations such as control of each part of the video-conference communications terminal apparatus, handling of high layers of video-conference communications, execution of various kinds of application programs which this terminal apparatus is provided with, display of help information relevant to a user's help request, and so forth. A ROM (Read Only Memory) 2 stores some of control-operation programs which the system controller 1 executes, various kinds of data necessary for executing the control-operation programs, and so forth. A RAM (Random Access Memory) 3 forms a work area used by the system controller 1.

A clock circuit 4 supplies current date, time information. A scanner 5 inputs or reads in an original image with a predetermined resolution. A plotter 6 outputs or prints out an image with a predetermined resolution. A coder/decoder 7 encodes and compresses an image signal obtained as a result of reading in an original image through the scanner 5 in accordance with an encoding method of a Group-4 facsimile function. The coder/decoder 7 further decodes and decompresses encoded image information so as to obtain an original image signal. An image processor 8 performs various kinds of image processing such as size alteration and resolution alteration of image data. A magnetic disk device 9 stores system software, a plurality of application programs, a lot of user data, and so forth.

A liquid crystal display device 10 is used as a display device when a tele-writing function is executed and when a user manipulates the video-conference communications terminal apparatus. An LCD display controller 11 controls display contents of the liquid crystal display device 10.

A touch panel device 12 is provided on a display screen of the liquid crystal display device 10, and supplies coordinate data, touch state data and so forth when a user touches the liquid crystal display device 10 through the touch panel device 12. A touch panel controller 13 controls operation of the touch panel device 12.

An audio input/output device 14 includes a microphone for inputting and a speaker for outputting sound (voice) for communications. An analog audio signal input through the microphone of the audio input/output device 14 is supplied to an audio CODEC 15, and an analog audio signal to be output through the speaker of the audio input/output device 14 is one which is supplied to the audio input/output device 14 from the audio CODEC 15.

The audio CODEC 15 converts the analog audio signal to digital data which is thus transmitted via the B-channel of ISDN. The audio CODEC 15 further converts the digital data transmitted through the B-channel of the ISDN into the audio signal. An audio controller 16 controls operation of the audio input/output device 14.

A video camera device 17 captures images on the side of a user of this terminal apparatus, and a moving-picture signal thus supplied by the video camera device 17 is supplied to a video signal input terminal of a moving-picture CODEC 18 and also to a moving-picture signal input terminal of a display controller 19. A video camera controller 20 controls operation of the video camera device 17 such as image capturing start/end, zooming in/out, panning and so forth.

The moving-picture CODEC 18 converts the moving-picture signal in an analog NTSC format into digital moving-picture data, converts the digital moving-picture data into moving-picture data in a predetermined CIF format, and then codes and compresses it using an encoding method according to the ITU-T recommendation H.261 so as to produce moving-picture information. Further, the moving-picture CODEC 18 converts encoded and compressed moving-picture information into original moving-picture data in the CIF format, converts it into digital moving-picture data in the NTSC format, and then converts it into an analog moving-picture signal in the analog NTSC format.

A still-image camera device 21 captures still images, and an analog NTSC signal (still-image signal) thus supplied by the still-image camera device 21 is supplied to a still-image CODEC 22.

The still-image CODEC 22 converts the still-image signal supplied by the still-image camera device 21 into digital data, and then encodes and compresses it using a predetermined encoding method such as, for example, a JPEG method. Further the still-image CODEC 22 decodes compressed still-image information into an original still-image signal. The still-image CODEC 22 supplies, to a still-image signal input terminal of the display controller 19, the still-image signal supplied by the still-image camera device 21 or the still-image signal obtained as a result of decoding. A still-image camera controller 23 controls operation of the still-image camera device 21 such as image capturing start/end, zooming in/out, and so forth.

The display controller 19 controls display contents of a video monitor device 24. Specifically, the display controller 19, according to instructions given by the system controller 1, forms display image information of the moving-picture signal supplied by the video camera device 17 or moving-picture CODEC 18 and display image information of the still-image signal supplied by the still-image CODEC 22. The display controller 19 then forms display images being displayed through the video monitor device 24 in a manner in which the thus-formed display image information is combined appropriately.

An ISDN interface circuit 25 is connected to ISDN and has a function of processing signals of an ISDN layer 1 and functions of integrating/separating a D-channel signal and two B-channel signals. The D-channel communicates with a D-channel transmission controller 26, and the two B-channel signals communicates with a multiplexer/demultiplexer device 27.

The D-channel transmission controller 26 has a function of processing signals of a D-channel layer 2 and a call control function of call connection/disconnection of one or two B-channels.

The multiplexer/demultiplexer 27 multiplexes data from a plurality of media communicated via the B-channels such as audio data, moving-picture data and general-use data (still-image data and so forth). The multiplexer/demultiplexer 27 then forms frame data prescribed in the ITU-T recommendation H.221, and sends it to the communications line. Further, the multiplexer/demultiplexer 27 demultiplexes the data, originally from the plurality of media, multiplexed in the frame data received. The multiplexer/demultiplexer 27 communicates the audio data with the audio CODEC 15, the moving-picture data with the moving-picture CODEC 18, and the general-use data with the system controller 1.

Each of the system controller 1, ROM 2, RAM 3, clock circuit 4, scanner 5, plotter 6, coder/decoder 7, image processor 8, magnetic disk device 9, LCD display controller 11, touch panel controller 13, audio CODEC 15, audio controller 16, moving-picture CODEC 18, display controller 19, video camera controller 20, still-image camera controller 23, D-channel transmission controller 26 and multiplexer/demultiplexer 27 is connected to an internal bus 28 which is mainly used for data communication between each of the above-mentioned parts.

Figure 2:
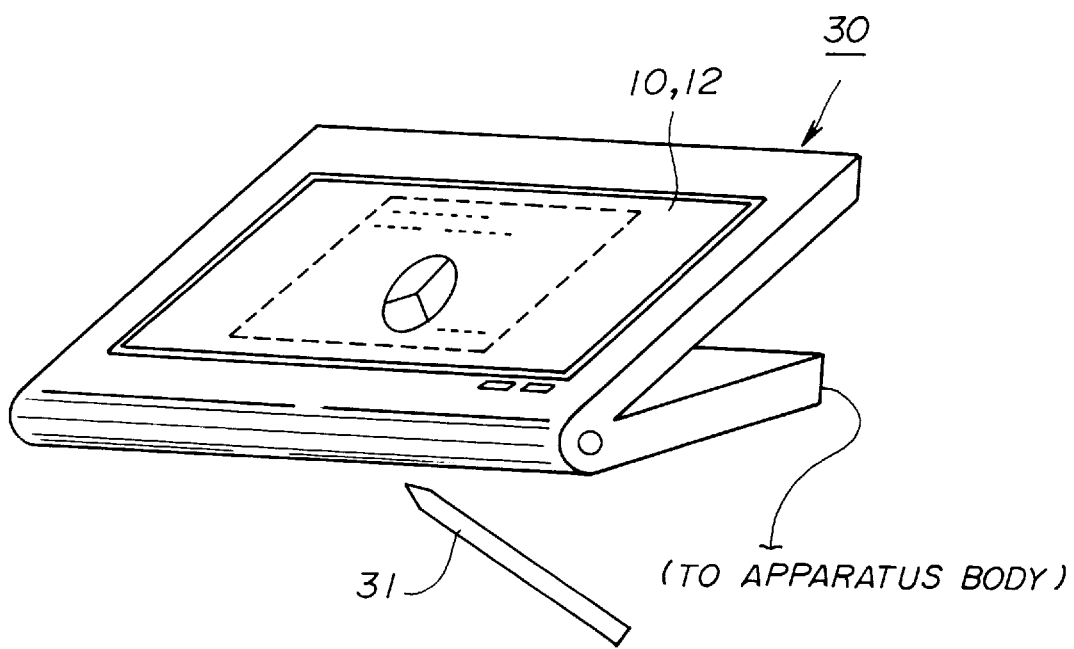
FIG. 2 shows an outlined perspective view of an example of an operation and display unit of the terminal apparatus shown in FIG. 1.

An example of an operation and display unit of the video-conference communications terminal apparatus shown in FIG. 1 will now be described with reference to FIG. 2. An operation and display unit 30 shown in FIG. 2 includes the liquid crystal display device 10 and touch panel device 12 which is attached to a display screen of the liquid crystal display device 10. A touch pen 31 is provided for a user to touch a desired position on an operation surface of the touch panel device 12.

Figure 3:
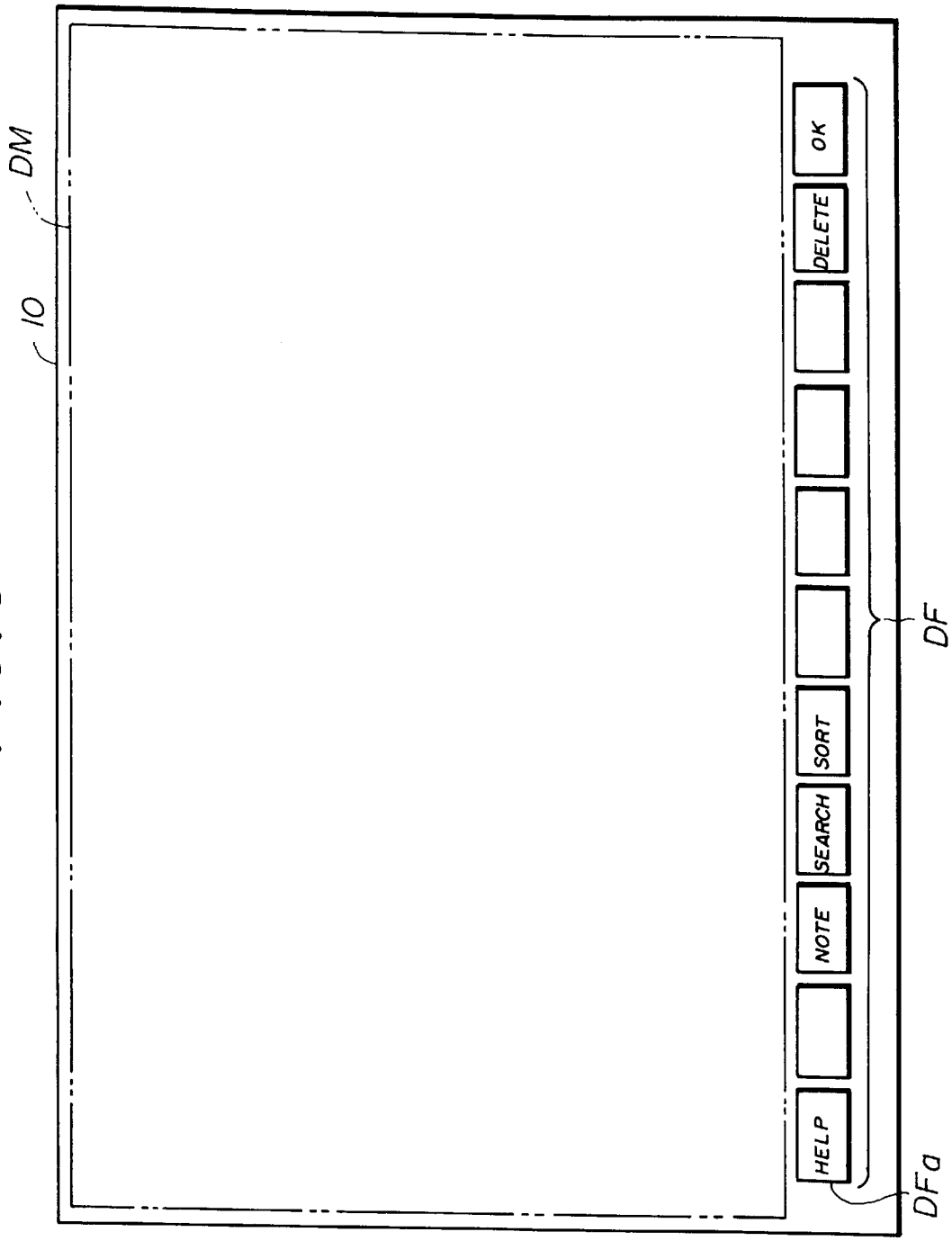
FIG. 3 shows an example of a display screen of a liquid crystal display device 10 of the terminal apparatus shown in FIG. 1.

As shown in FIG. 3, the display screen of the liquid crystal display device 10 is divided into an information display portion DM for mainly displaying the operation guidance information, tele-writing picture-drawing image and so forth, and a function-key display portion DF for displaying general operation commands. The help key DFa, for displaying a help screen, is one of specific keys displayed in the function-key display portion DF.

A user may use the touch pen 31 and thus touch the help key DFa in the function-key display portion DF. As a result, a help screen can be displayed which is appropriate for a state currently being executed of an application program currently being executed by the video-conference communications terminal apparatus.

An example case will now be assumed in which the video-conference communications terminal apparatus is provided with application programs of a basic system, a video-conference session, tele-writing communications, Group-4 facsimile, and report display/output. In this case, individual help file data is set for each of these application programs, and is stored in the magnetic disk device 9 so as to be relevant to the relevant application program.

Further, each application program has a specific plurality of operation states set therefor, and at least one item of help data which can be referred to by a user is set for each operation state. Thus, each application program has help file data set therefor, and the help file data includes a plurality of help files set for the plurality of operation states respectively.

A user may input a request for displaying help information as a result of touching the above-mentioned help key DFa. As a result, the video-conference communications terminal apparatus in the first embodiment displays relevant help information and also updates a help statistics table such as that shown in FIG. 4.

The help statistics table has, as shown in the figure, the following items: an application name, an application ID (identification number), a state being executed in a relevant application program when the help information display request is input, a type of help data being then displayed, and a number of times this help function has been used. When the help information display request is input, if there is no relevant row of help statistics data, a new row of help statistics data is created including a relevant application name, an application ID, a state being executed in a relevant application program when the help information display request is input, a type of help data being then displayed, and "1" to indicate a number of times this help function has been used. If a relevant row of help statistics data exits, a relevant number of times the help function has been used is incremented by one.

Data of such a help statistics table stored in each one of the video-conference communications terminal apparatuses (hereinafter referred to as user apparatuses) is collected by a specific apparatus (hereinafter referred to as a center apparatus). The center apparatus then forms an individual-user help statistics data table such as that shown in FIG. 5A using data of help statistics tables thus collected from the user apparatuses.

The individual-user help statistics data table includes, as shown in FIG. 5A, data of help statistics tables of respective user apparatuses. Each by-user statistics data for each user apparatus in the individual-user help statistics data table is such as that shown in FIG. 5B. It includes, as shown in the figure, a user ID (identification number) assigned to the user apparatus, a telephone number (ISDN address) assigned to the user apparatus, a temporary region for storing latest collected data of the help statistics table for the user apparatus, and a history region for storing data integrating all collected data of the help statistics table.

Thereby, in the center apparatus, information as to how many respective user apparatuses have had the help information display requests input thereto may be known. Using the information, the predetermined display order according to which the plurality of sets of help data are displayed one by one may be changed so as to obtain the predetermined order appropriate to an actual user's demand. For example, when an application program is revised, such a change of the predetermined display order may be made. Thus, convenience of use of the help function may be improved.

In addition to the change of the predetermined display order, it is also possible to divide a single set of help data or integrate a plurality of sets of help data so as to obtain sets of help data appropriate to actual user's demand. Thus, convenience of use of the help function may be further improved.

Figure 6:
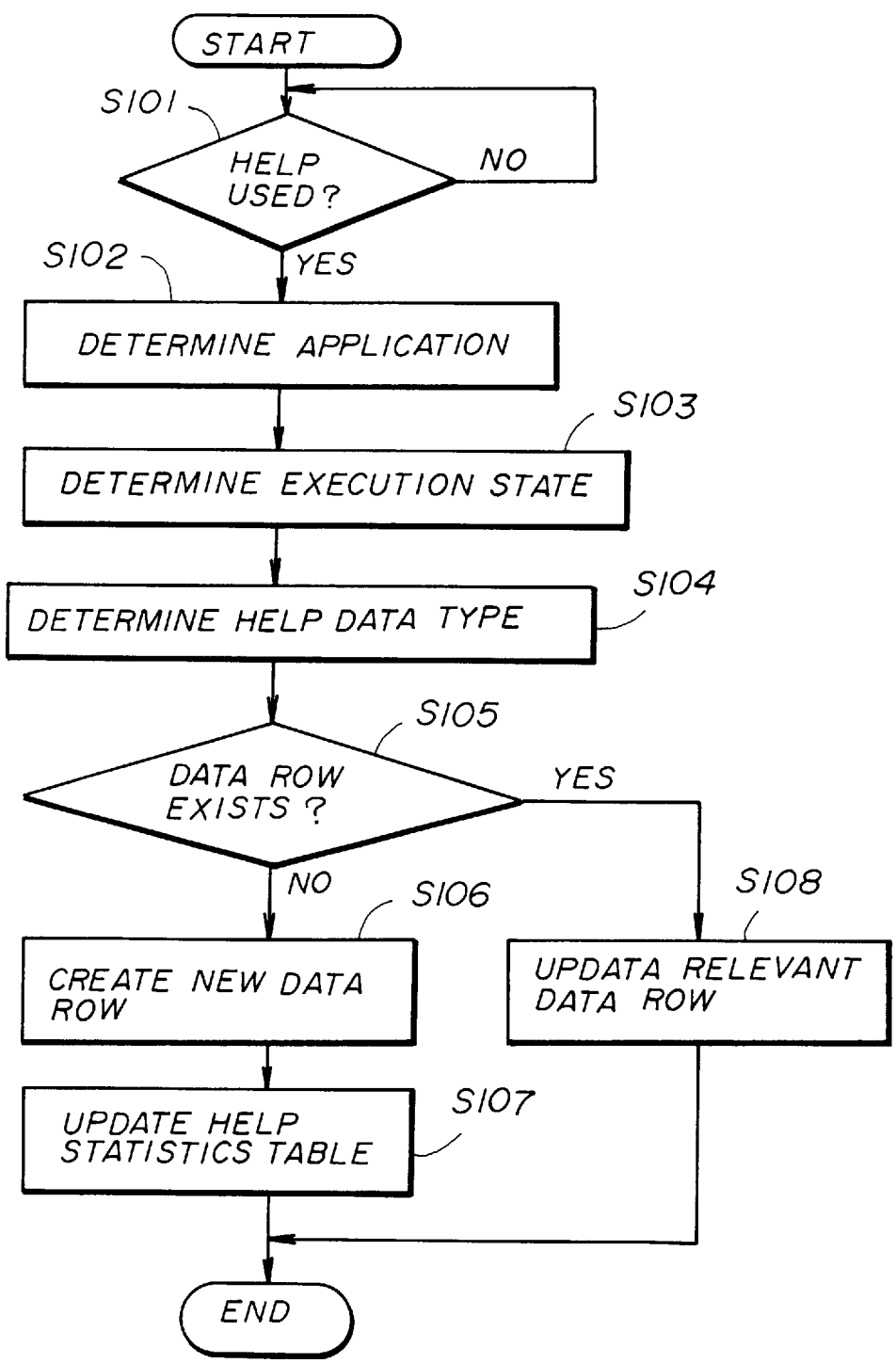
FIG. 6 shows a flowchart of an example of a help statistics data updating operation performed by the user apparatus.

An example of an operation performed by the user apparatus, other than displaying relevant help data, when a user inputs the help information display request will now be described with reference to FIG. 6.

In a step S101 (the term 'step' being omitted hereinafter), whether or not the help function is used is monitored. When the help function is used by the user as a result of inputting the help information display request (YES of S101), it is determined which kind of application program is being used in S102. Further, it is also determined in S103 which execution state is currently being executed in the application program execution. For example, which step of the application program is being executed is determined. Further, in S104, it is determined which type of help data is being displayed.

In S105, it is determined whether a row of help statistics data relevant to the thus-determined kind of application, execution state and help data kind exists in the help statistics data. If it does not exist (NO in S105), a relevant row of help statistics data is created in the table in S106. Thus the help statistics table is updated in S107. Then, the operation is terminated.

When a result of S105 is YES, the number of times the help function in the relevant row of help statistics data has been used is incremented by one in S108. Then, the operation is terminated.

Figure 7:
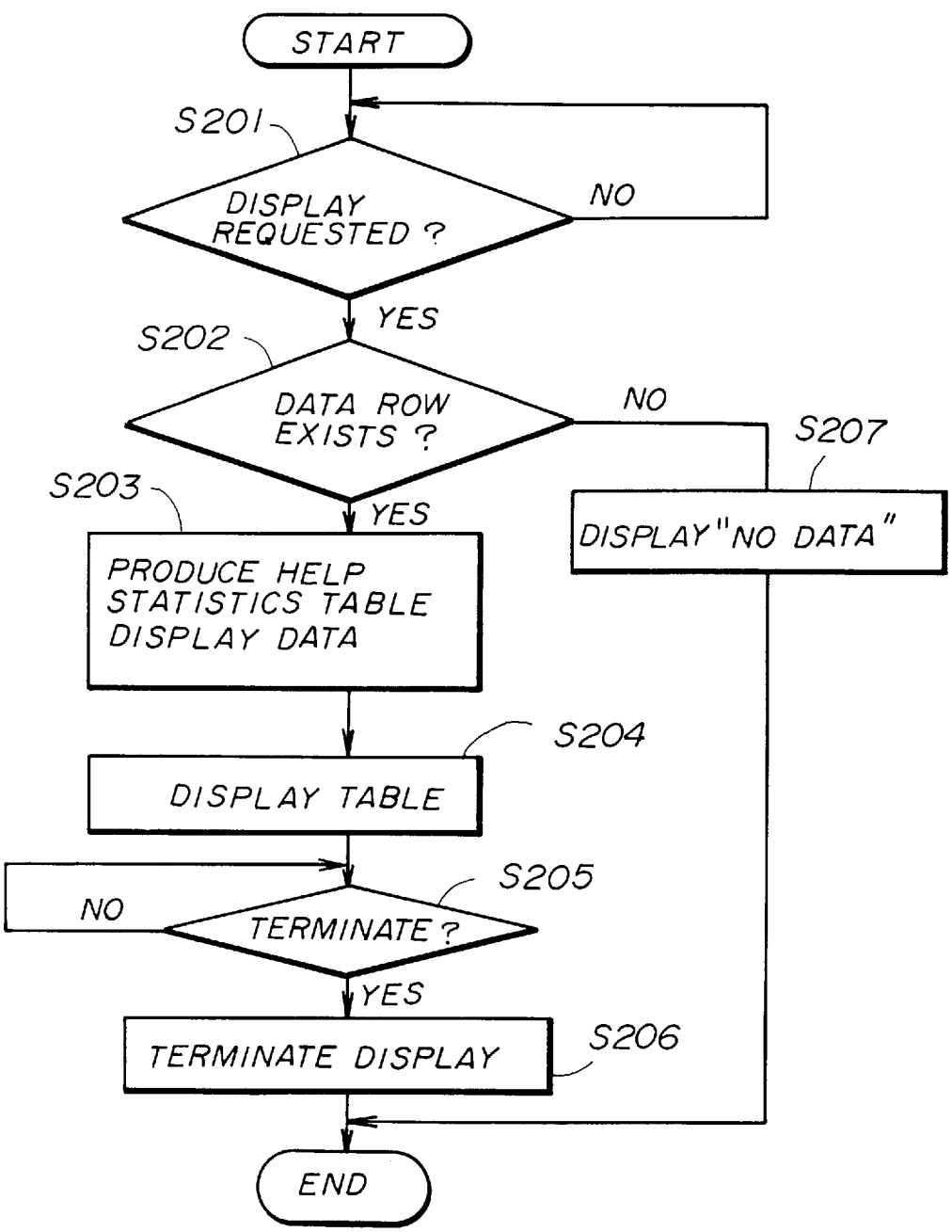
FIG. 7 shows a flowchart of an example of an operation performed by the terminal apparatus in the first embodiment when a user requests the apparatus to display the help statistics data.

A user may cause the relevant user apparatus to display rows of help statistics data. An example of an operation of the user apparatus performed in this case will now be described with reference to FIG. 7.

When the user inputs instructions for displaying rows of help statistics data (YES resulting from S201), it is determined in S202 whether at least one row of help statistics data exists. If a result of S202 is YES, data for displaying the contents of the help statistics table in S203 are produced. In S204, the contents of the help statistics table are displayed through the liquid crystal display device 10.

Then, it is monitored in S205 whether the user inputs instructions for terminating the display. If the user inputs instructions for terminating the display (YES resulting from S205), the display of the help statistics table through the liquid crystal display device 10 is terminated in S206. Then the operation is terminated.

When no row of help statistics data exists in the help statistics table (NO resulting from S202), a message indicating that no row of help statistics data exists in the help statistics table is displayed through the liquid crystal display device 10 in S207. Then the operation is terminated.

Figure 8:
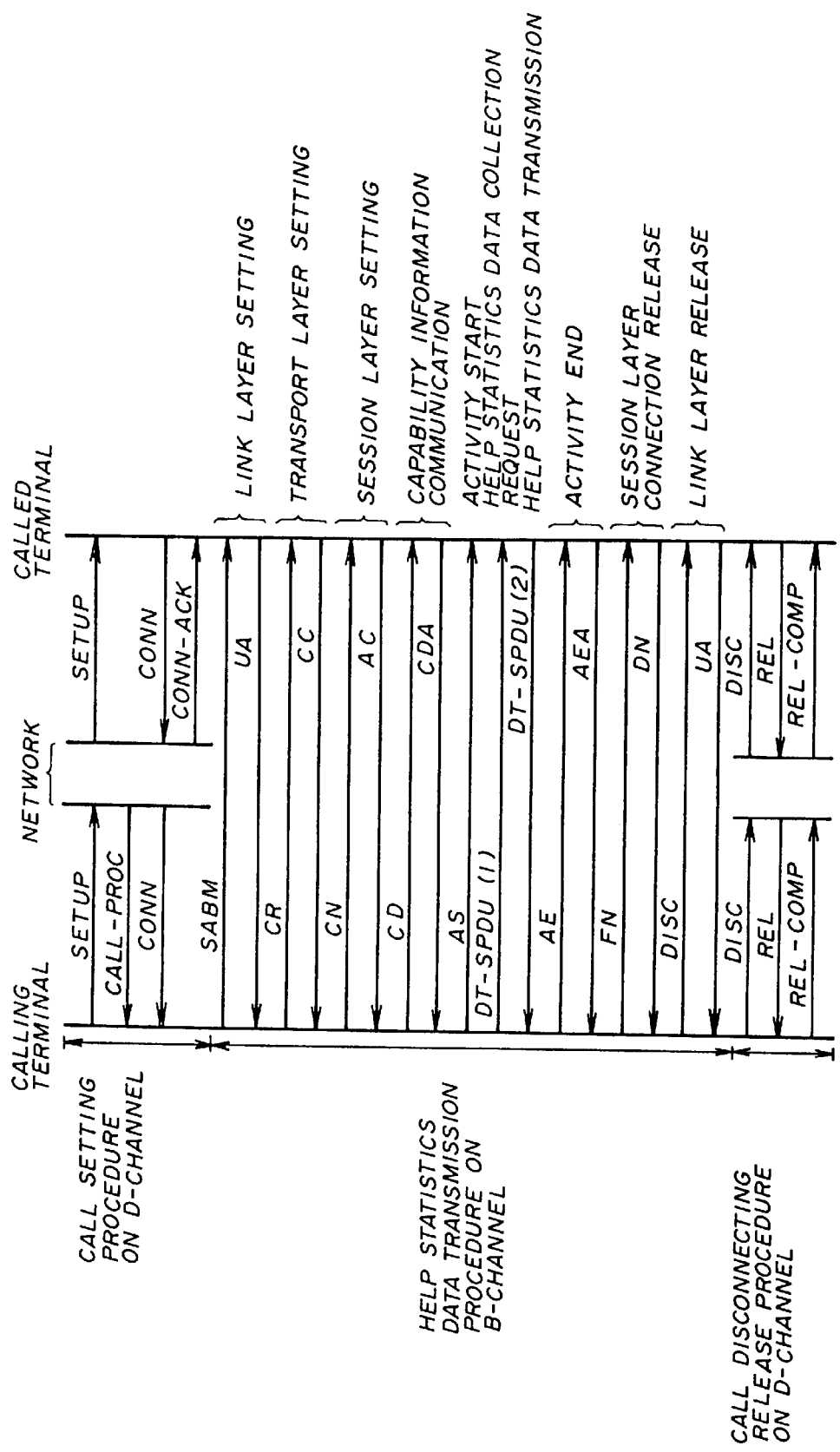
FIG. 8 shows a time chart of an example of an operation performed by the center apparatus and user apparatus when the center apparatus collects the help statistics data from the user apparatus.
Figure 9:
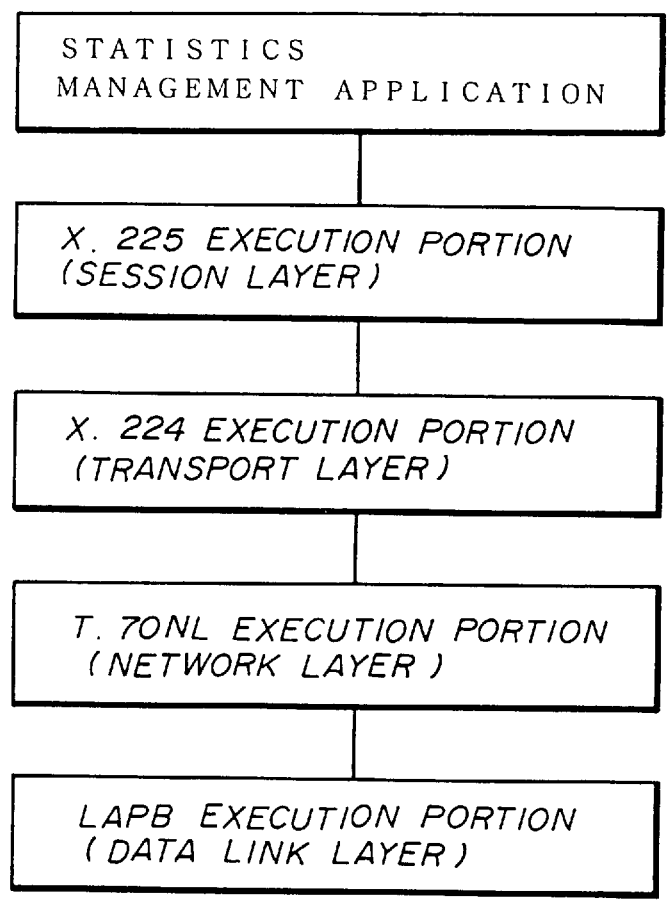
FIG. 9 shows an example of an outlined structure of a data transmission protocol when collecting help statistics data.
Figure 10:
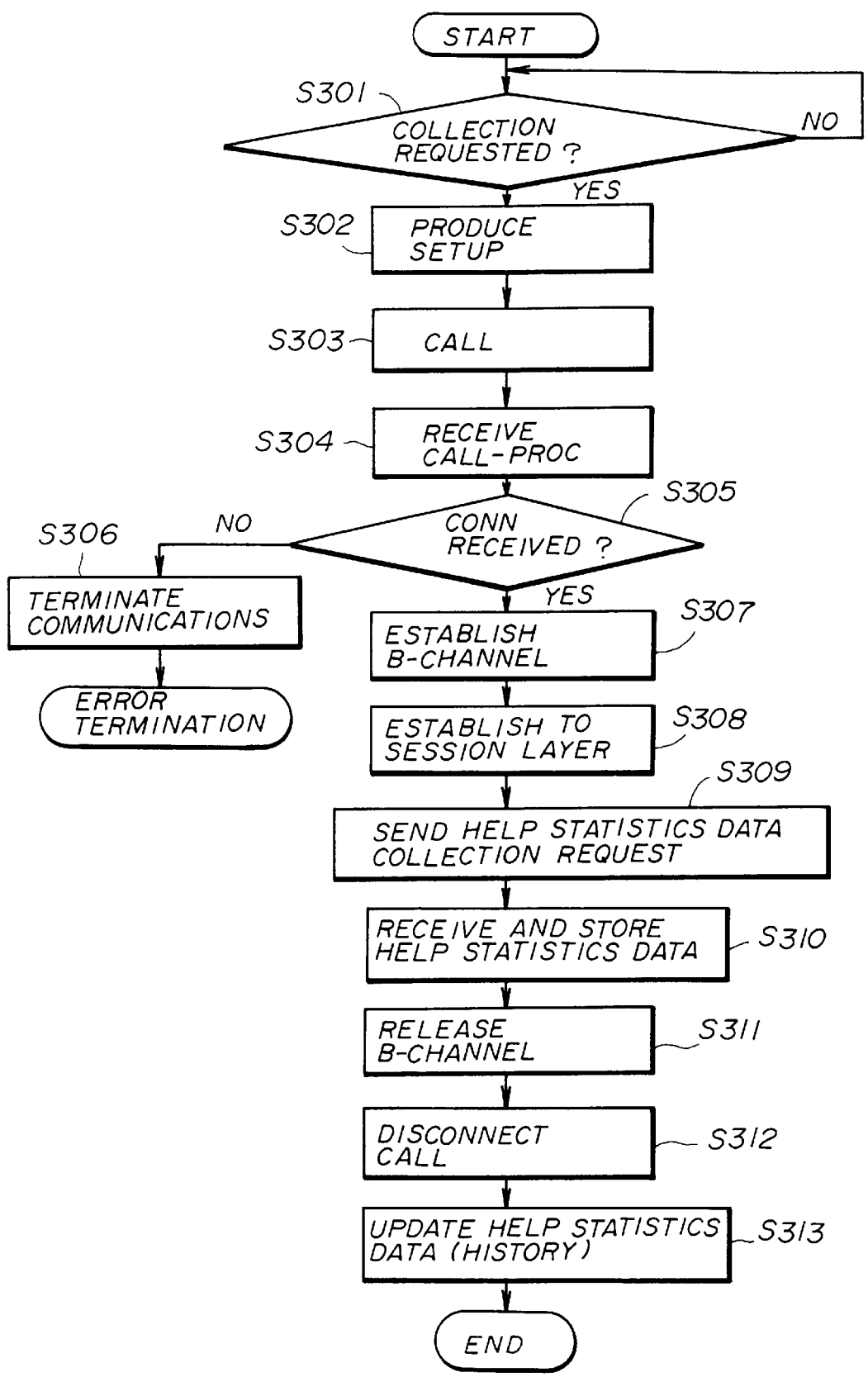
FIG. 10 shows a flowchart of an example of an operation when the center apparatus collects the help statistics data from the user apparatus.

With reference to FIGS. 8, 9, 10 and 11, an example of an operation executing a data transmission procedure when the center apparatus collects the contents of the help statistics table from the user apparatus will be described. FIG. 9 shows an example of a structure of a data transmission protocol used for executing the data transmission procedure shown in FIG. 8. The protocol shown in FIG. 9 is formed using protocols according to well-known CCITT recommendations.

The protocol shown in FIG. 9 includes a statistics management application, an X.225 (session layer) execution portion, an X.224 (transport layer) execution portion, a T.70NL (null) (network layer) execution portion and an LAPB (Link Access Procedure Balanced) (data link layer) execution portion.

A user may input, to the center apparatus, a request for collecting the contents of the help statistics table from any user apparatus. If the user does so (YES resulting from S301 shown in FIG. 10), the center apparatus, acting as the calling terminal, specifies the objective user apparatus, acting as a called terminal, as a destination of the calling, as a result of setting a previously set ISDN address of the called terminal at a 'called party number' information element in a call setting message SETUP. Further, the calling terminal sets data indicating a 'request of collecting help statistics data' at a 'user to user' information element of the message SETUP. Thus the message SETUP is formed in S302.

Then, the calling terminal sends the call setting message SETUP, as shown in FIG. 8, to the ISDN. Thus, the calling terminal requests call setting in S303. Thereby, the ISDN sends a call setting acceptance message CALL_PROC, for informing the calling terminal of a call setting state and the calling terminal receives this message in S304. The ISDN then sends, to the specified called terminal, the call setting message SETUP. Thus the ISDN calls the called terminal.

Figure 11:
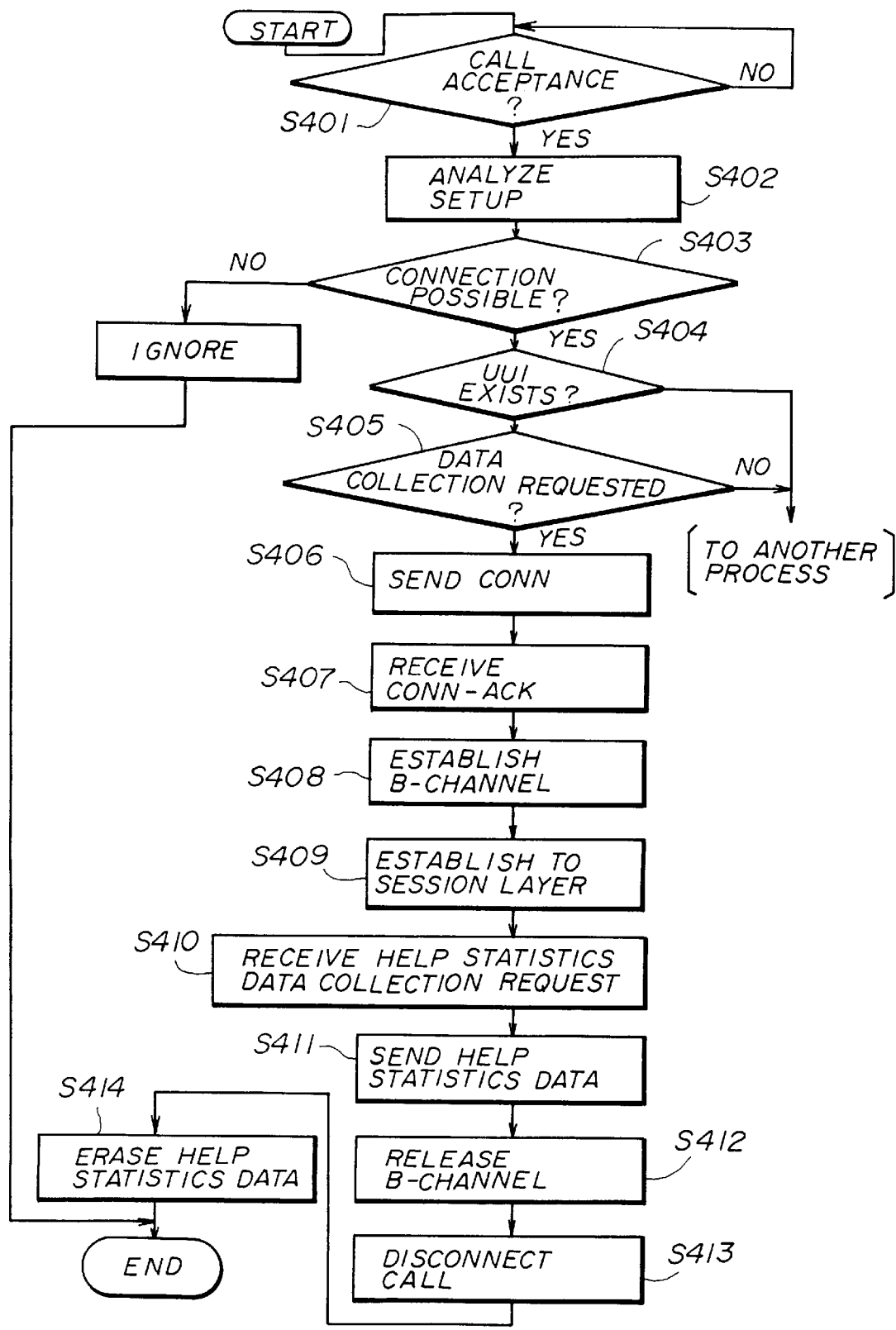
FIG. 11 shows a flowchart of an example of an operation when the user apparatus sends the help statistics data to the center apparatus.

The called terminal accepts the call (YES resulting from S401 shown in FIG. 11). Then, the called terminal analyzes the thus-sent message SETUP in S402, and determines in S403 whether or not connection with the calling terminal is possible. If a result of S403 is NO, the called terminal ignores the call acceptance, and terminates this operation.

If a result of S403 is YES, the called terminal determines in S404 whether or not the thus-sent message SETUP includes the 'user to user' information element. If a result of S404 is YES, the called terminal determines in S405 whether or not the contents of the 'user to user' information element are data indicating the 'request of collecting help statistics data'. If a result of S404 is NO, the called terminal continues the operation to an ordinary call acceptance operation. If a result of S405 is NO, the called terminal also continues the operation to an ordinary call acceptance operation.

If a result of S405 is YES, the called terminal responds to the call acceptance, and sends a response message CONN to the ISDN in S406. The message CONN is then sent to the calling terminal, and is received by the calling terminal (YES resulting from S305 shown in FIG. 10). The ISDN then sends, to the called terminal, a response acknowledge message CONN_ACK and thus acknowledges the response of the called terminal. By receiving the message CONN_ACK in S407, the called terminal recognizes the B-channel to be used. Thus, the B-channel for data transmission between the calling terminal and called terminal is established by the calling terminal in S307 and by the called terminal in S408. Then, the data transmission procedure will be executed on the B-channel by the calling and called terminals.

If the message CONN is not received by the calling terminal (NO resulting from S305), the calling terminal terminates the communications operation in S306, and displays a message indicating an error occurrence.

After the B-channel is established between the calling and called terminals, the calling terminal sends a command SABM and thus requests link layer setting. The called terminal responds thereto by sending a response UA to the calling terminal. Thus the link layer is set. Then, in order to set a transport layer, the calling terminal sends a signal CR, and the called terminal sends a signal CC, thus accepting the signal CR. Thereby, the transport layer is set. Then, in order to set a connection of a session layer, the calling terminal sends a signal CN, and the called terminal sends a signal AC, thus accepting the signal CN. Thus, the data transmission protocol is executed and thus the session layer is established by the calling terminal in S308 and by called terminal in S409.

Then, the calling and called terminals communicate a signal CD and a signal CDA to each other and thus communicate information indicating respective capabilities to each other. A data transmission function is thus set and the calling terminal sends, to the called terminal, a signal AS indicating the thus-set data transmission function. Thereby, activity on the session layer is started.

The calling terminal sends, to the called terminal, predetermined data DT_SPDU (1) indicating the request of collecting help statistics data in S309. After receiving the data DT_SPDU (1) in S410, the called terminal sends, in S411, to the calling terminal, data DT_SPDU (2) which has the contents of the help statistics table set therein, the help statistics table being a current one of the called terminal currently.

After receiving the thus-sent contents of the help statistics table, the calling terminal stores the thus-received contents in S310. Then, the calling terminal sends a signal AE, and the called terminal sends a signal AEA. Thus, the activity is terminated. Then, the calling terminal sends a signal FN, and the called terminal sends a signal DN. Thus, the connection of the session layer is released. Then, the calling terminal sends a link layer command DISC, and the called terminal sends a response UA. Thus the link layer is released.

Thus, the link on the B-channel is released by the calling terminal in S311 and by the called terminal in S412. Then, the calling terminal sends, to the ISDN, a disconnect message DISC so as to request the ISDN to clear the end-to-end connection. The ISDN sends a release message REL to the calling terminal so as to inform the calling terminal that the D-channel has been disconnected. The ISDN also sends the disconnect message DISC to the called terminal so as to inform the called terminal that the end-to-end connection has been cleared, and the called terminal sends the release message REL to the ISDN so as to request the ISDN to release the D-channel. (With regard to the disconnect message and release message, see CCITT recommendation, Q.931.)

In response thereto, the calling terminal sends, to the ISDN, a release completion message REL_COMP, informing the ISDN of channel release completion. Thereby, the D-channel between the calling terminal and the ISDN is released. Further, the ISDN sends the release completion message to the called terminal and thereby the D-channel between the ISDN and called terminal is also released. As a result, the D-channel established between the calling and called terminals is completely released. Thus, the call is disconnected and released by the calling terminal in S312 and by the called terminal in S413.

Summarizing the above, the B-channel is established between the calling and called terminals; the calling terminal sends, to the called terminal, the request for sending the contents of the help statistics table; the called terminal sends the current contents of the help statistics table to the calling terminal; and then the B-channel is released.

Based on the contents of the help statistics table thus sent from the called terminal, the calling terminal updates, in S313, the contents of the relevant by-user help statistics data of the user apparatus acting as the called terminal to which the calling terminal called.

The calling terminal (center apparatus) may instead have user-integrated help statistics data resulting from integrating help statistics data obtained from all of the user apparatuses. In this case, the contents of the user-integrated help statistics data are updated based on the contents of the help statistics table thus received from each user apparatus.

After sending the contents of the help statistics table, the called terminal erases all of the contents of this help statistics table, in S414. Then, the called terminal will start formation of a new help statistics table.

Thus, the operation is terminated in the calling and called terminals.

In the above-described operation, the data indicating 'request of collecting help statistics data' is set at the 'user to user' information element in the call setting message SETUP. However, instead, it is also possible to set the data indicating 'request of collecting help statistics data' at a 'calling party subaddress' information element, as special subaddress information, in the call setting message SETUP. Both the 'user to user' information element and 'calling party subaddress' information element are well known as those according to the CCITT recommendations.

In the above-described operation, the center apparatus sends the request for requesting the user apparatus to send the help statistics data to the center apparatus. However, it is also possible that, without receiving such a request, each user apparatus periodically (for example, every month) sends the current contents of the help statistics table to the center apparatus. Thus, the center apparatus can collect the help statistics data from respective user apparatuses.

An example of an operation executing a data transmission procedure between the user and center apparatuses will now be described with reference to FIGS. 12, 13 and 14.

Figure 13:
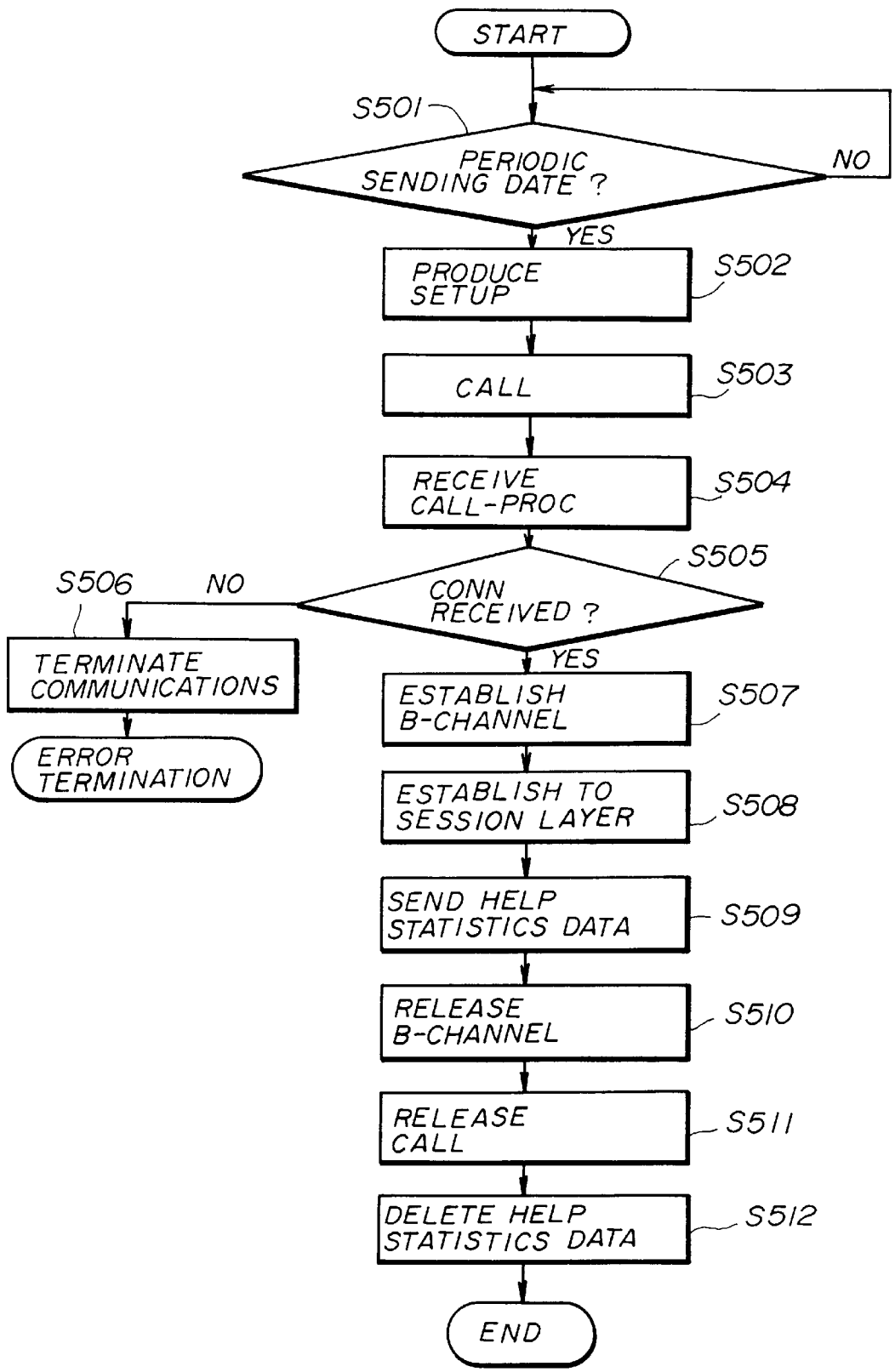
FIG. 13 shows a flowchart of an example of an operation when the user apparatus sends the help statistics data to the center apparatus.

Each user apparatus monitors in S501 shown in FIG. 13 whether or not a periodic sending date is reached. When the periodic sending data is reached (YES resulting from S501), the user apparatus, acting as a calling terminal, specifies the center apparatus, acting as a called terminal, as a destination of the calling, as a result of setting a predetermined ISDN address of the called terminal at a 'called party number' information element in the call setting message SETUP. Further, the calling terminal sets data indicating 'sending of collecting help statistics data' at the 'user to user' information element of the message SETUP. Thus the message SETUP is formed in S502.

Figure 12:
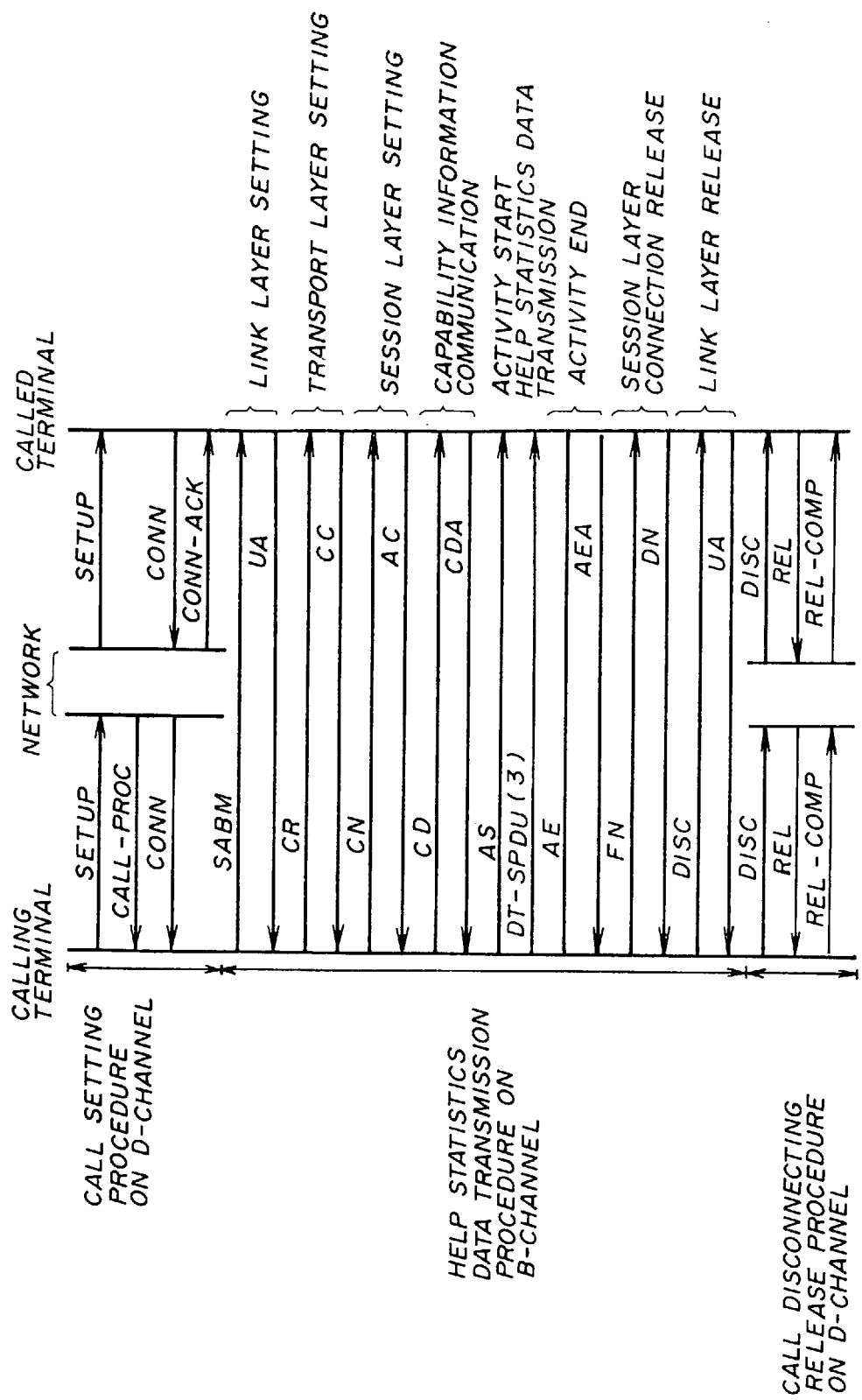
FIG. 12 shows a time chart of another example of an operation performed by the center apparatus and user apparatus when the center apparatus collects the help statistics data from the user apparatus.

Then, the calling terminal sends the call setting message SETUP, as shown in FIG. 12, to the ISDN. Thus, the calling terminal requests call setting in S503. Thereby, the ISDN sends a call setting acceptance message CALL_PROC, for informing the calling terminal of a call setting state, and the calling terminal receives this message in S504. The ISDN then sends, to the specified called terminal, the call setting message SETUP. Thus the ISDN calls the called terminal.

Figure 14:
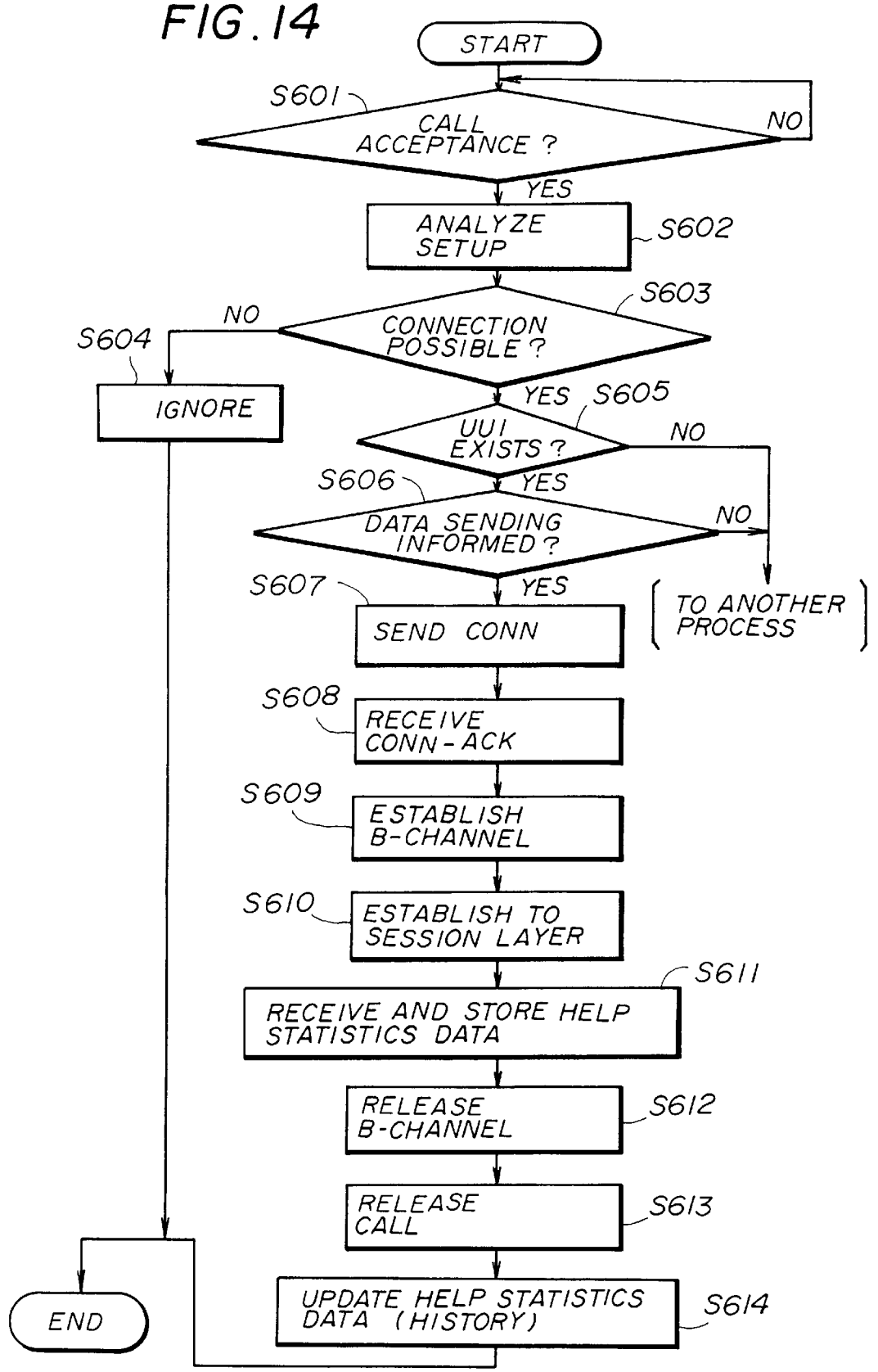
FIG. 14 shows a flowchart of an example of an operation when the center apparatus receives the help statistics data from the user apparatus.

The called terminal accepts the call (YES resulting from S601 shown in FIG. 14). Then, the called terminal analyzes the thus-sent message SETUP in S602, and determines in S603 whether or not connection with the calling terminal is possible. If a result of S603 is NO, the called terminal ignores the call acceptance in S604, and terminates this operation.

If a result of S603 is YES, the called terminal determines in S605 whether or not the thus-sent message SETUP includes the 'user to user' information element. If a result of S605 is YES, the called terminal determines in S606 whether or not the contents of the 'user to user' information element are data indicating the 'sending of help statistics data'. If a result of S605 is NO, the called terminal continues the operation to an ordinary call acceptance operation. If a result of S606 is NO, the called terminal also continues the operation to an ordinary call acceptance operation.

If a result of S606 is YES, the called terminal responds to the call acceptance, and sends the response message CONN to the ISDN in S607. The message CONN is then sent to the calling terminal, and is received by the calling terminal (YES resulting from S505 shown in FIG. 13). The ISDN then sends, to the called terminal, a response acknowledge message CONN_ACK and thus acknowledges the response of the called terminal. By receiving the message CONN_ACK in S608, the called terminal recognizes the B-channel to be used. Thus, the B-channel for data transmission between the calling terminal and called terminal is established by the calling terminal in S507 and by the called terminal in S609. Then, the data transmission procedure will be executed on the B-channel by the calling and called terminals.

If the message CONN is not received by the calling terminal (NO resulting from S505), the calling terminal terminates the communications operation in S506, and displays a message indicating an error occurrence.

After the B-channel is established between the calling and called terminals, the calling terminal sends a command SABM and thus requests link layer setting. The called terminal responds thereto by sending a response UA to the calling terminal. Thus the link layer is set. Then, in order to set a transport layer, the calling terminal sends a signal CR, and the called terminal sends a signal CC, thus accepting the signal CR. Thereby, the transport layer is set. Then, in order to set a connection of a session layer, the calling terminal sends a signal CN, and the called terminal sends a signal AC, thus accepting the signal CN. Thus, the data transmission protocol is executed and thus the session layer is established by the calling terminal in S508 and by called terminal in S610.

Then, the calling and called terminals communicate a signal CD and a signal CDA to each other and thus communicate information indicating respective capabilities to each other. A data transmission function is thus set and the calling terminal sends, to the called terminal, a signal AS indicating the thus-set data transmission function. Thereby, activity on the session layer is started.

The calling terminal (user apparatus) sends, in S509, to the called terminal (center apparatus), predetermined data DT_SPDU (3) which has the current contents of the help statistics table of the user apparatus set therein.

After receiving the thus-sent contents of the help statistics table, the called terminal stores the thus-received contents in S611.

Then, the calling terminal sends a signal AE, and the called terminal sends a signal AEA. Thus, the activity is terminated. Then, the calling terminal sends a signal FN, and the called terminal sends a signal DN. Thus, the connection of the session layer is released. Then, the calling terminal sends a link layer command DISC, and the called terminal sends a response UA. Thus the link layer is released.

Thus, the link on the B-channel is released by the calling terminal in S510 and by the called terminal in S612. Then, the calling terminal sends, to the ISDN, a disconnect message DISC so as to request the ISDN to clear the end-to-end connection. The ISDN sends a release message REL to the calling terminal so as to inform the calling terminal that the D-channel has been disconnected. The ISDN also sends the disconnect message DISC to the called terminal so as to inform the called terminal that the end-to-end connection has been cleared, and the called terminal sends the release message REL to the ISDN so as to request the ISDN of the release of the D-channel. (With regard to the disconnect message and release message, see CCITT recommendation, Q.931.)

In response thereto, the calling terminal sends, to the ISDN, a release completion message REL_COMP, informing the ISDN of the channel release completion. Thereby, the D-channel between the calling terminal and the ISDN is released. Further, the ISDN sends the release completion message to the called terminal and thereby the D-channel between the ISDN and called terminal is also released. As a result, the D-channel established between the calling and called terminals is completely released. Thus, the call is disconnected and released by the calling terminal in S511 and by the called terminal in S613.

Summarizing the above, the B-channel is established between the calling and called terminals; the calling terminal sends, to the called terminal, the contents of the help statistics table; and then the B-channel is released.

Based on the contents of the help statistics table thus sent from the calling terminal, the called terminal (center apparatus) updates, in S614, the contents of the relevant by-user help statistics data of the user apparatus acting as the calling terminal. Which user apparatus has been acting as the calling terminal may be determined by referring to the contents of the 'calling party number' information element included in the received call setting message SETUP.

The called terminal (center apparatus) may instead have user-integrated help statistics data resulting from integrating help statistics data obtained from all of the user apparatuses. In this case, the contents of the user-integrated help statistics data are updated based on the contents of the help statistics table thus received from each user apparatus.

Further, after sending the contents of the help statistics table, the calling terminal (user apparatus) erases all of the contents of its help statistics table, in S512. Then, the calling terminal will start formation of a new help statistics table.

Thus, the operation is terminated in the calling and called terminals.

In the above-described operation, the data indicating 'sending of help statistics data' is set at the 'user to user' information element in the call setting message SETUP. However, instead, it is also possible set the data indicating 'sending of help statistics data' at the 'calling party subaddress' information element, as special subaddress information, in the call setting message SETUP.

As mentioned above, the help function may supply help information while the apparatus is displaying the previously stored operation guidance information of the apparatus. The operation guidance information is such as that which is automatically displayed on a screen of the apparatus as a temporary screen and indicates how to manipulate the apparatus, for example, how to press a certain operation key, while a predetermined data processing operation is being performed.

In such a case, the help information explains contents of an item of the operation guidance information currently being displayed. For this purpose, the apparatus previously stores therein the sets of help information so that a set of help information, appropriate for an item of the operation guidance information currently being displayed, may be selected from among the sets of help information in response to the help-information supply request being input while a screen of the item of operation guidance information is being displayed.

It is possible to produce the help statistics table only relevant to sets of the help information used to explain respective items of operation guidance information. Such a type of the help statistics table will be referred to as a guidance help statistics table, hereinafter. An example of such a table, instead of that shown in FIG. 4, is shown in FIG. 15. This table includes items: an application name of an application program which is executed when a relevant help information display is requested, an application ID (identification number) assigned to the application program, a type (item) of the operation guidance information which is displayed when the relevant help information display is requested, and a number of times the help function has been used.

Each user apparatus may produce the guidance help statistics table such as that shown in FIG. 15 in a manner similar to one in which the user apparatus produces the help statistics table such as that shown in FIG. 4. The center apparatus may collect the contents of the guidance help statistics tables from the many user apparatuses. The center apparatus may produce an individual-user help statistics data table such as that shown in FIGS. 5A and 5B from the contents of the guidance help statistics tables collected from the many user apparatuses.

By referring to the thus-produced individual-user help statistics data table, information can be obtained as to how the help information display requests have been input for individual types of operation guidance information to many user apparatuses. From the thus-obtained information, it can be assumed which type of operation guidance information is hard for users to easily understand. Based on the assumption, it is possible to modify the contents of the type of operation guidance information so that it may be one which users can easily understand.

After the contents of the operation guidance information are thus improved, users may easily understand the operation guidance information and thus may not need to input help information display requests. Thus, a data amount of the help information can be effectively reduced. As an operation manner has become increasingly complicated in recent data processing apparatuses, a data amount of the help information has become larger. In such a situation, effective reduction of the data amount of the help information by improving the operation guidance information is advantageous.

Figure 16:
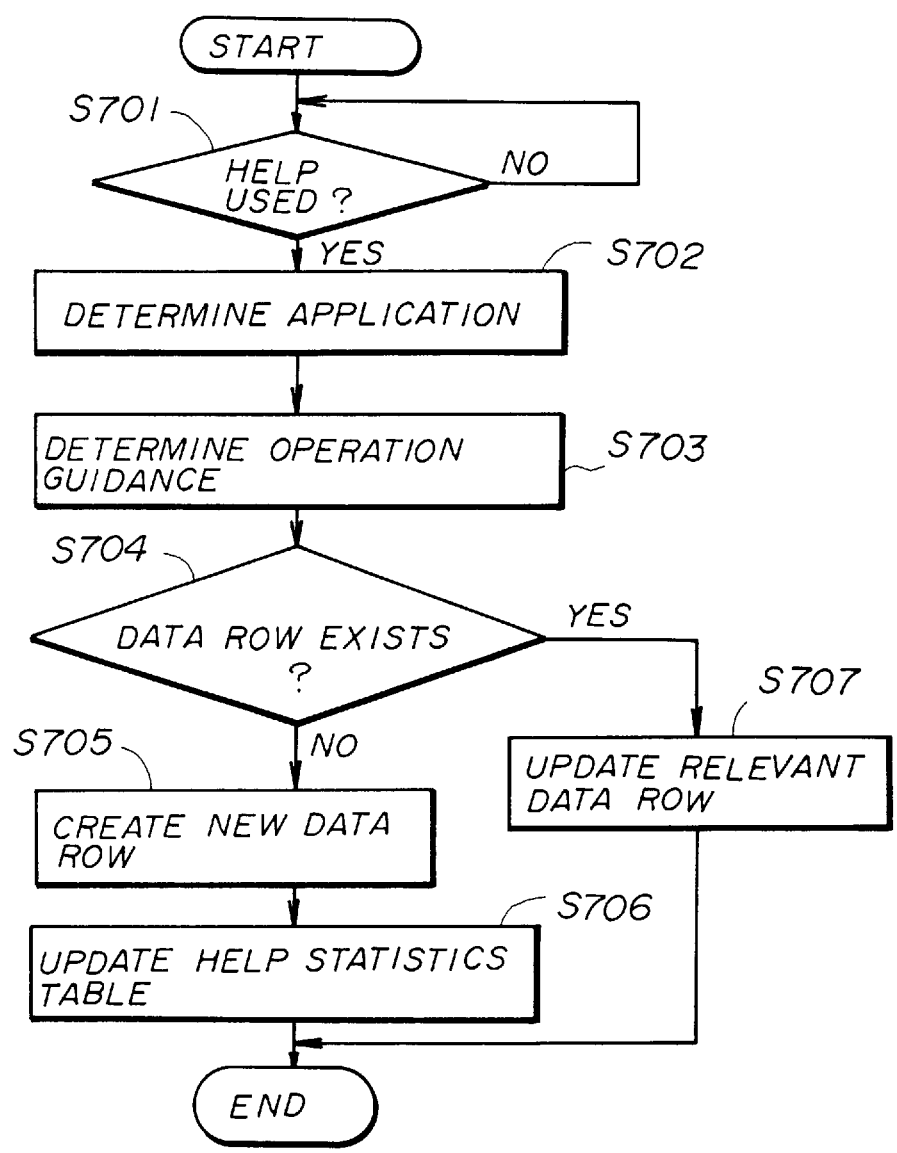
FIG. 16 shows a flowchart of another example of a help statistics data updating operation performed by the user apparatus.

With reference to FIG. 16, an example of an operation performed by the user apparatus when a user inputs the help information display request while a type of operation guidance information is being displayed will now be described.

It is monitored in S701 whether or not the help function is used. If the help function is used (YES resulting from S701), it is determined in S702 which application program is currently executed in the user apparatus. Further, it is determined in S703 which type of operation guidance information is currently being displayed in the currently executed application. The results of S702 and S703 are temporarily stored.

In S704, it is determined whether a row of guidance help statistics data relevant to the thus-determined kind of application program and type of operation guidance information exists in the help statistics data. If it does not exist (NO in S704), a relevant row of guidance help statistics data is created in the table in S705. Thus the guidance help statistics table is updated in S706. Then, the operation is terminated.

When a result of S704 is YES, the number of times the help function in the relevant row of guidance help statistics data has been used is incremented by one in S707. Then, the operation is terminated.

It is possible that the help statistics data may be output by printing it out through the plotter 6, instead of displaying it through the liquid crystal display unit 10.

The above-described first embodiment of the present invention is the video-conference communications terminal apparatus. However, the present invention may also be similarly applied to other types of communications terminal apparatuses. Further, the present invention may also be similarly applied to data processing apparatuses other than communications terminal apparatuses.

Figure 17:
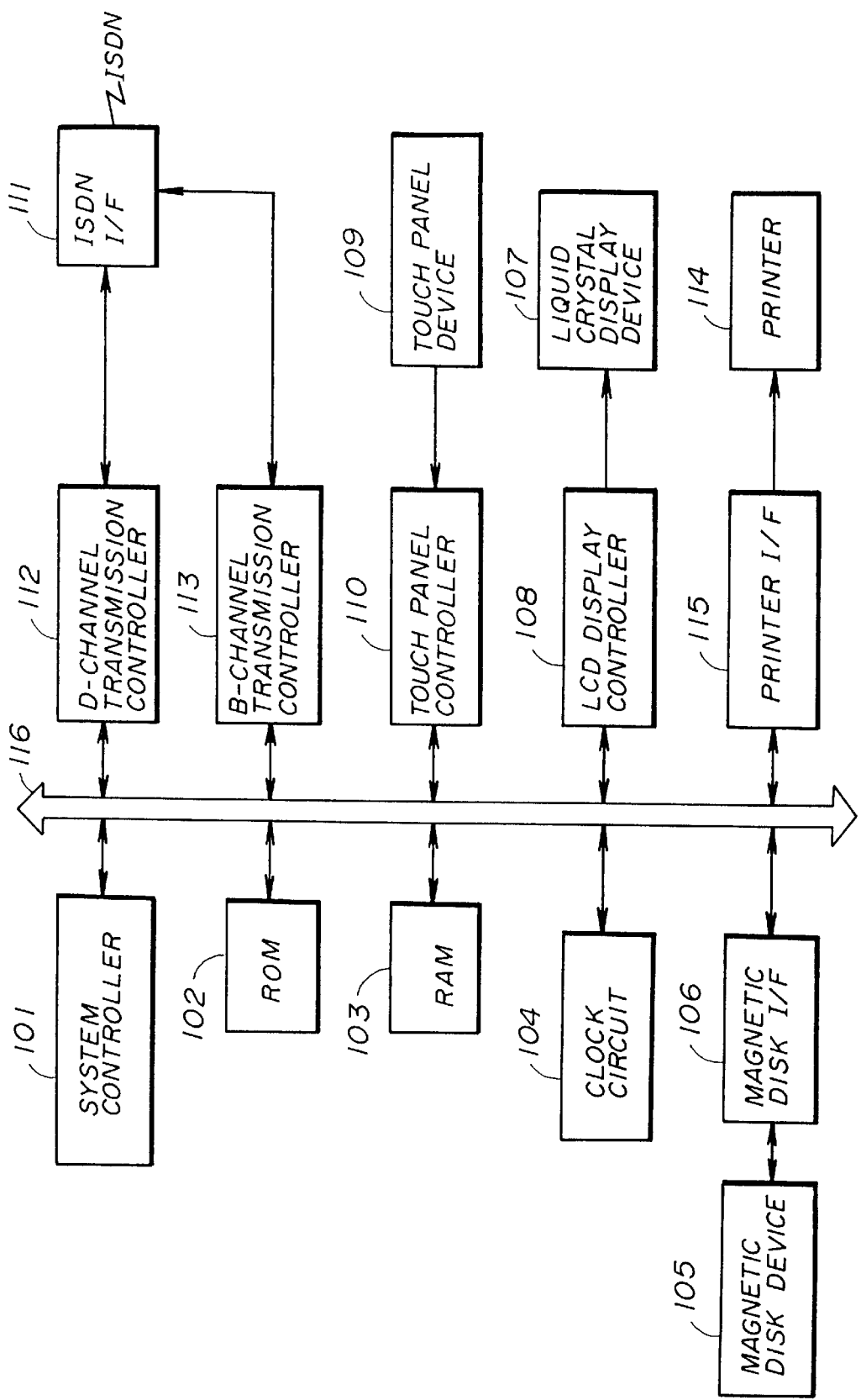
FIG. 17 shows a block diagram of the center apparatus in a second embodiment of the present invention.

A data processing apparatus, referred to as a center apparatus, in a second embodiment of the present invention will now be described with reference to FIG. 17. This center apparatus uses the basic interface of the ISDN as a transmission path.

A system controller 101 performs various kinds of control operations such as controlling respective parts of the center apparatus, high layer processing for communications of help display history information, a help-statistics-data display operation in response to user's help-statistics-data display request, and so forth. A ROM (Read-Only Memory) 102 stores some of control-operation programs which the system controller 101 executes, various kinds of data necessary for executing the control-operation programs, and so forth. A RAM (Random Access Memory) 103 forms a work area used by the system controller 101.

A clock circuit 104 supplies current date, time information. A magnetic disk device 105 is connected to a magnetic disk interface (I/F) 106, and stores control operation programs which the system controller 101 executes, help statistics data and so forth. A liquid crystal display device 107 displays various kinds of information used by a user for operating the center apparatus. An LCD display controller 108 controls display contents of the liquid crystal display device 107. A touch panel device 109 is provided on a display screen of the liquid crystal display device 107, and outputs coordinate data indicating a position touched by a user. A touch panel controller 110 controls an operation of the touch panel device 109.

An ISDN interface circuit 111 is connected to the ISDN, and has an ISDN layer-1 signal processing function. The circuit 111 communicates a signal of the D-channel via a D-channel transmission controller 112. The circuit 111 communicates a signal of the B-channel via a B-channel transmission controller 113. The D-channel transmission controller 112 has a D-channel layer-2 signal processing operation, and a call control function for call connecting/disconnecting of the D-channel. The B-channel transmission controller 113 has a B-channel layer-2 signal processing function for executing the data link layer LAPB (Link Access Procedure Balanced).

A printer 114 is connected to a printer interface 115, and prints out help statistics data, communications history information and so forth.

Each of the system controller 101, ROM 102, RAM 103, clock circuit 104, magnetic disk interface 106, LCD display controller 108, touch panel controller 110, D-channel transmission controller 112, B-channel transmission controller 113 and printer interface 115 is connected to an internal bus 116 which carries data between them.

Each of a plurality of user apparatuses is connected to the center apparatus via the ISDN. When a user inputs, to a relevant user apparatus, a help information display request, the user apparatus forms and then updates history information of a number of times the help information display requests has been input, for every application program currently being executed, for every execution state of the application program being executed and for every help data type which type of help data is being displayed in response to a help information display request. The thus-formed history information is stored in a help statistics table such as that shown in FIG. 18 the same as that shown in FIG. 4. This table is formed and updated in a manner such as that described with reference to FIG. 6.

Instead of or in addition to this, it is possible that each user apparatus has the help statistics table such as that shown in FIG. 15 for the help information to be displayed while the operation guidance information is being displayed. This table may be formed and updated in a manner such as that described with reference to FIG. 16.

An example of an operation by which the center apparatus collects the contents of the help statistics tables of the respective user apparatuses is the same as one described with reference to FIGS. 8, 9, 10 and 11 for the first embodiment. Another example thereof is the same as one described with reference to FIGS. 12, 13 and 14 for the first embodiment.

The center apparatus may have a user-integrated help statistics data table having data resulting from integrating data of the help statistics tables of all of the user apparatuses. This table may be the same as that shown in FIG. 18. When the center apparatus receives the help statistics data from a user apparatus, the center apparatus updates the user-integrated help statistic data table. Specifically, numbers of times the help function has been used are summed for every type of help data. When a user of the center apparatus inputs a help-statistics-data display request to the center apparatus, the center apparatus displays the contents of the user-integrated help statistics data table in a form such as that shown in FIG. 18 on the liquid crystal display device 107.

Figure 19:
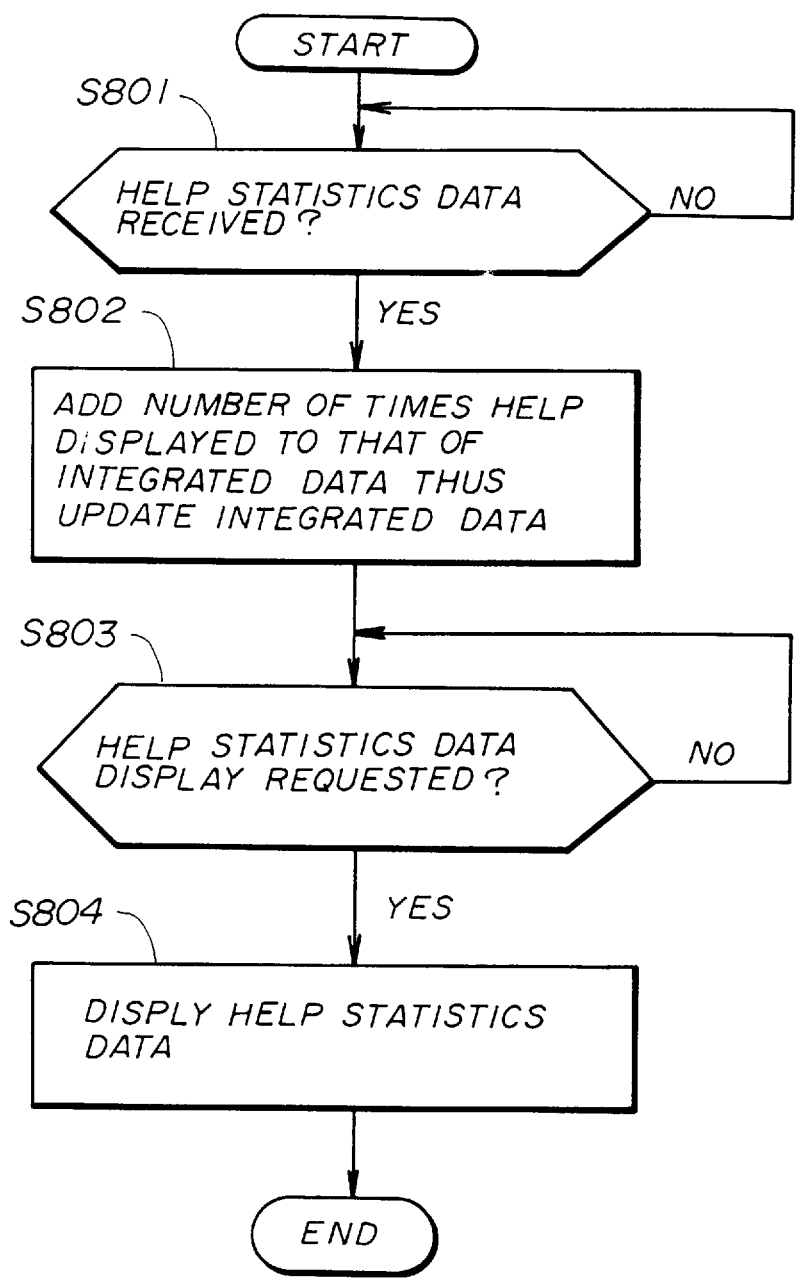
FIG. 19 shows a flowchart of an example of a help statistics table updating and display operation performed by the center apparatus in the second embodiment.

With reference to FIG. 19, this operation performed by the center apparatus will now be described. In S801, it is monitored whether the help statistics data is received from a user apparatus. If it is received (YES resulting from S801), the numbers of times the help function was used as indicated in the received data are added to the corresponding ones of the data of the user-integrated help statistics data table respectively in S802. It is determined in S803 whether or not the help statistics data display request is input. If it is input (YES resulting from S803), the center apparatus displays in S804 the contents of the user-integrated help statistics data table in a form such as that shown in FIG. 18 on the liquid crystal display device 107.

Further, the center apparatus may further or instead have individual help statistics tables which correspond to those of individual user apparatuses respectively. Each of these tables may be the same as that shown in FIG. 18. The individual help statistics tables are managed individually for every user apparatus. A number of the individual statistics tables is the same as a number of user apparatuses which the center apparatus manages. When the center apparatus receives the help statistics data from a user apparatus, the center apparatus updates a help statistics table, among the individual help statistics tables, relevant to this user apparatus.

In this case, the center apparatus has an individual-user help statistics data table such as that shown in FIG. 20A using data of help statistics tables collected from the user apparatuses. The individual-user help statistics data table includes, as shown in FIG. 20A, data of help statistics tables of every user apparatus. Each by-user statistics data for each user apparatus in the individual-user help statistics data table is such as that shown in FIG. 20B. It includes, as shown in the figure, a user ID (identification number) assigned to the user apparatus, a telephone number (ISDN address) assigned to the user apparatus and a history region for storing data integrating all collected data of the help statistics table. A data storage format of the history region may be such as that shown in FIG. 18. The contents of the history region are updated when the help statistics data is received from a user apparatus.

Figure 21:
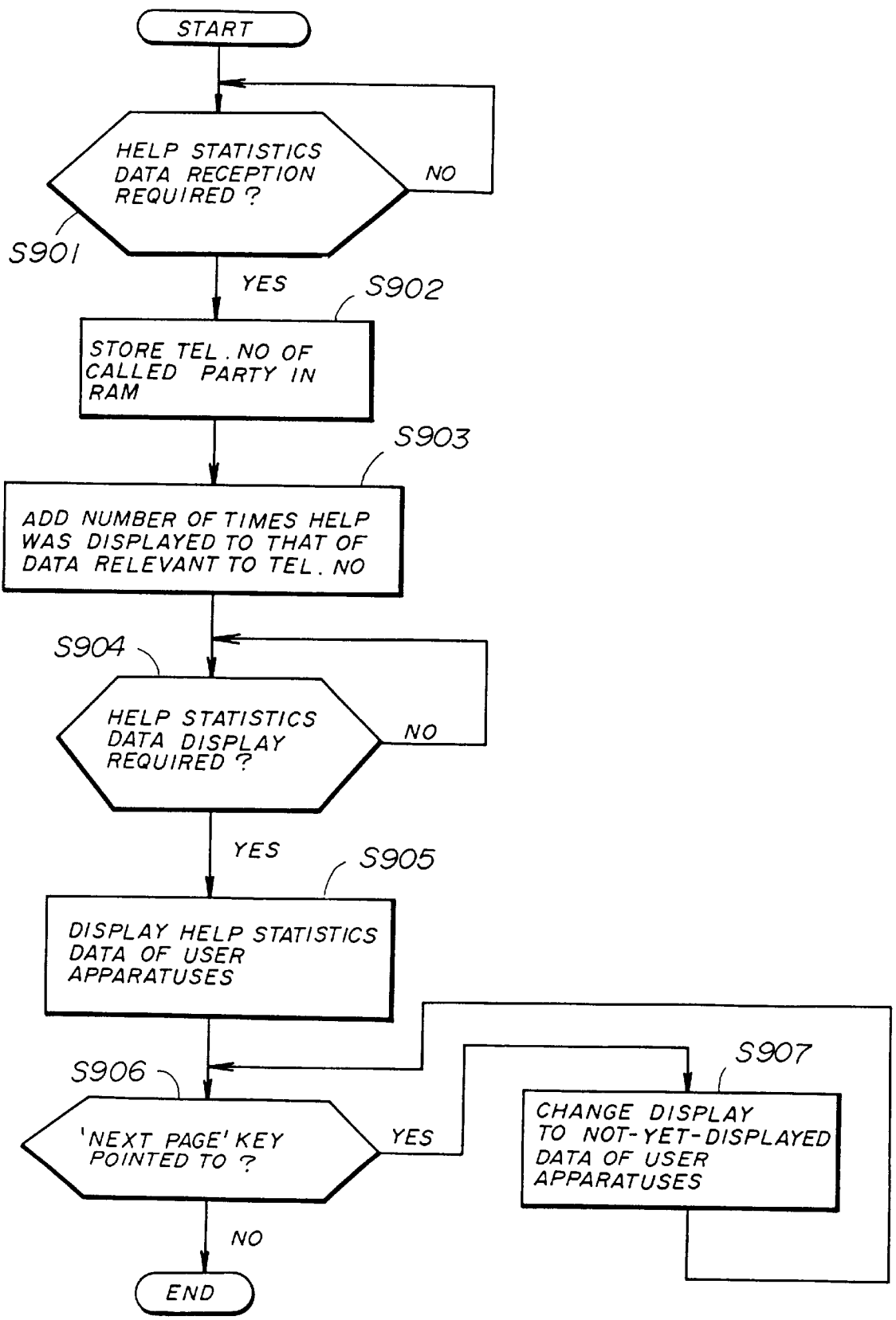
FIG. 21 shows a flowchart of another example of a help statistics table updating and display operation performed by the center apparatus in the second embodiment.

With reference to FIG. 21, an example of an operation of collecting help statistics data from the user apparatuses, and forming and updating the above-mentioned individual-user help statistics data table will now be described.

A user may input, to the center apparatus, a request for collecting the contents of the help statistics table from any user apparatus. If the user does so (YES resulting from S901), the center apparatus stores in the RAM 103 a telephone number of the called user apparatus in S902. Then, by executing communications protocol such as that shown in FIG. 9, the center apparatus receives the help statistics data from the user apparatus. Then, the center apparatus updates the contents of by-user help statistics data of the individual-user help statistics data table, which data is relevant to the user apparatus, stored in the center apparatus, in S903.

Specifically, the numbers of time the help function was used as indicated in the received data are added to the corresponding ones of the help statistics table of the history region in the by-user help statistics data for the user apparatus. Each by-user help statistics data stored in the center apparatus has a telephone number of a relevant user apparatus as shown in FIG. 20B. Therefore, by referring to the telephone number stored in the RAM 103 in S902, the help statistics table for the particular user apparatus is identified.

It is determined in S904 whether or not the help statistics data display request is input. If it is input (YES resulting from S904), the center apparatus displays in S905 the contents of one or more help statistics tables in the by-user help statistics data for respective one or more user apparatuses separately, each as shown in FIG. 22, on the liquid crystal display device 107.

It is determined in S906 whether a 'next page' key provided on the center apparatus, for example, by being displayed on the liquid crystal display device 107, is pointed to by the user. If the 'next page' key is pointed to, the help statistics tables displayed on the liquid crystal display device 107 are changed to those of user apparatuses which have not been displayed yet, among the by-user help statistics data of all of the user apparatuses. Thus, by repeatedly pointing the key, the user may cause the help statistics tables of the respective user apparatuses, and thus a desired one, to be displayed.

In a case where the center apparatus has the user-integrated help statistics data table such as that shown FIG. 18 or a case where the center apparatus has the individual-user help statistics data table such as that shown in FIG. 20A, it is preferable that the center apparatus has a function of sorting the help statistics data. The sorting is such as that by which a displayed arrangement of the rows of the help statistics data becomes such that a data row having a larger number of uses of the help function is located higher in the table. It can be assumed that a operation manner relevant to an execution state of an application program or operation guidance information in a data row having a larger number of uses of the help function is hard for user to easily understand. Such a data row may be easily discovered after performing such sorting on the help statistics table. Thus, the sorting function is convenient for managing the help statistics data.

For example, as a result of performing the sorting operation on the help statistics table shown in FIG. 18, that shown in FIG. 23 is obtained. Similarly, as a result of performing the sorting operation on the help statistics data shown in FIG. 22, that shown in FIG. 24 is obtained.

Figure 25:
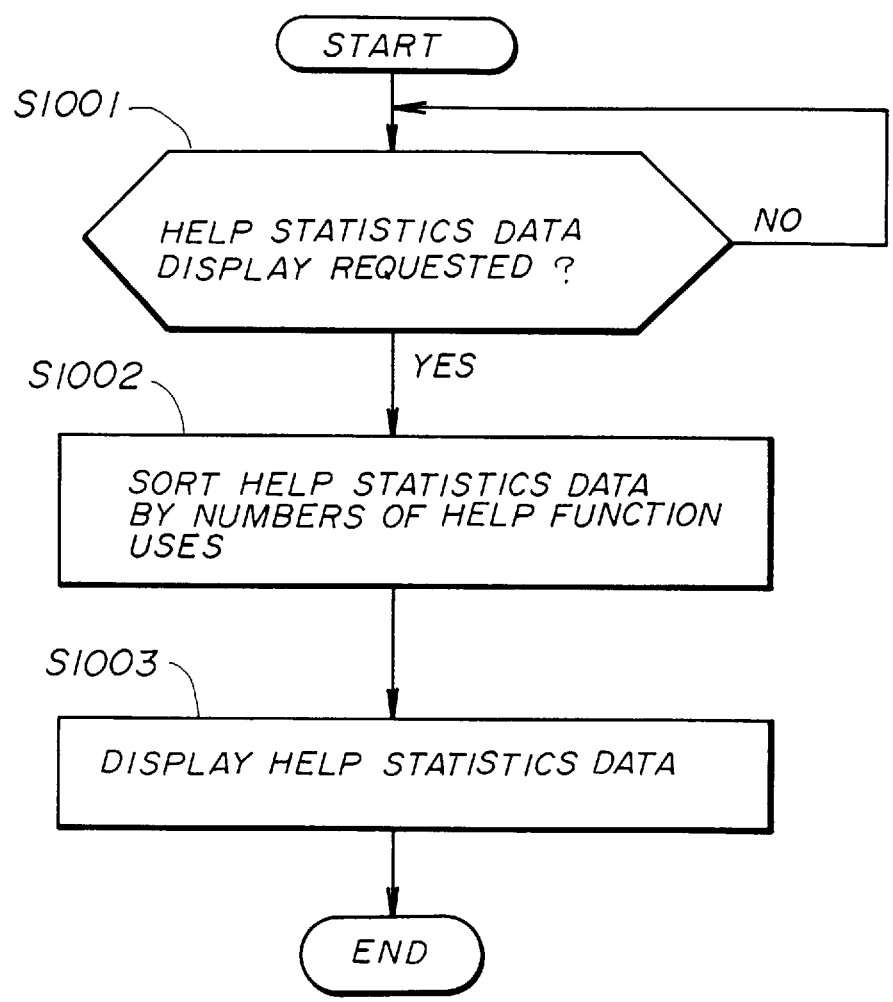
FIGS. 25 and 26 show flowcharts of examples of a help statistics data display operation performed by the center apparatus shown in FIG. 17.

An example of an operation of a display of the displayed help statistics data performed by the center apparatus having the sorting function and having the user-integrated help statistics data table will now be described with reference to FIG. 25. It is determined in S1001 whether or not the help statistics data display request is input. If it is input (YES resulting from S1001), the center apparatus performs, in S1002, the sorting operation on the help statistics data in the form of the user-integrated help statistics data table such as that shown in FIG. 18. In S1003, the center apparatus displays the contents of the user-integrated help statistics data table in the form such as that shown in FIG. 23 on the liquid crystal display device 107.

Figure 26:
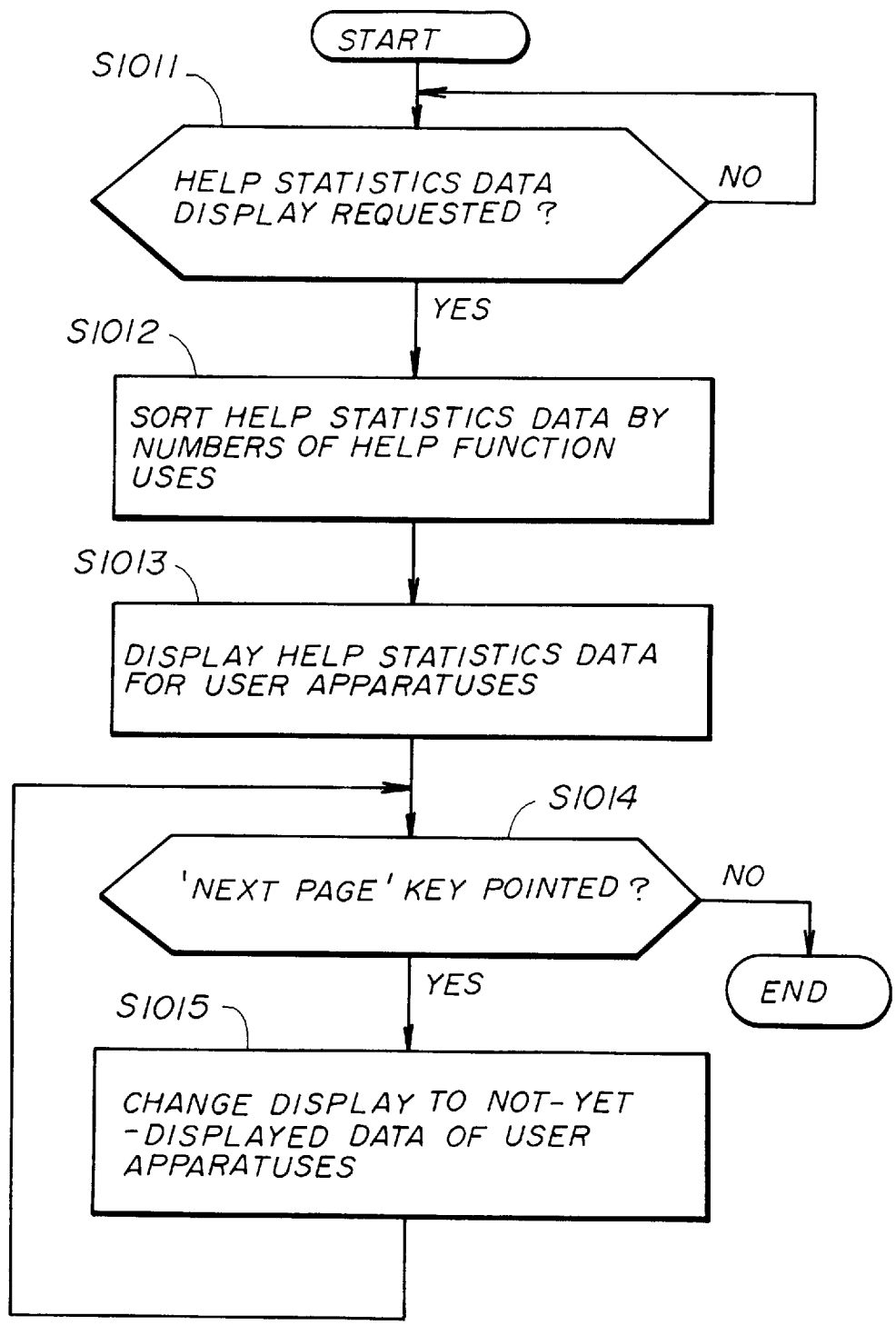

An example of an operation of a display of the displayed help statistics data performed by the center apparatus having the sorting function and having the individual-user help statistics data table will now be described with reference to FIG. 26. It is determined in S1011 whether or not the help statistics data display request is input. If it is input (YES resulting from S1011), the center apparatus performs, in S1012, the sorting operation on the help statistics data in the form of the individual-user help statistics data table such as that shown in FIG. 20A, the history region of each by-user help statistics data being such as that shown in FIG. 22. In S1013, the center apparatus displays the contents of the help statistics tables of the by-user help statistics data for some user apparatuses, each in the form such as that shown in FIG. 24 on the liquid crystal display device 107.

It is determined in S1014 whether the 'next page' key provided on the center apparatus is pointed to by the user. If the 'next page' key is pointed to, the help statistics tables of by-user help statistics data displayed on the liquid crystal display device 107 are changed, in S1015, to those of user apparatuses, which have not been displayed yet, among the data of all of the user apparatuses. Thus, by repeatedly pointing to the key, the user may cause the help statistics data of the respective user apparatuses, and thus a desired one, to be displayed.

It is possible that the center apparatus has a function such that a user may select whether the center apparatus has the user-integrated help statistics table such as that shown in FIG. 18 or the individual-user help statistics table containing the by-user help statistics data. Each of the by-user help statistics data has the help statistics table such as that shown in FIG. 18. Such a function is convenient for managing the help statistics data.

Further, the help statistics data updating, collecting, sorting and display operations described with reference to FIGS. 18 through 26 may be also applied to a case where the center apparatus manages the help statistics data for the help information to be displayed while the operation guidance information is being displayed. In this case, the formation of the help statistics table such as that shown in FIG. 15 may be used instead of one such as that shown in FIG. 18.

Further, it is possible that the help statistics information may be output by printing it out through the printer 114, instead of by displaying it through the liquid crystal display unit 107.

Further, application of the present invention is not limited to the management of the help statistics data or help information display history information. The present invention may be similarly applied to management of statistics information or history information on how, for example, respective menus or respective predetermined kinds of functions which a relevant data processing apparatus has in its application programs have been selected or used. According to the present invention, statistics information or history information for various kinds of subject matters concerning operations of application programs performed by data processing apparatuses may be managed and thus convenience in manipulation of the apparatuses may be effectively improved. As a result of such history information being collected by the center apparatus from the user apparatuses, the manipulation convenience improvement is further effectively performed.

Further, the present invention is not limited to the above-described embodiments, and variations and modifications may be made without departing from the scope of the present invention.

What is claimed is:

1. A data processing method comprising the steps of:
   a) storing items of a predetermined kind of information for respective internal states of a data processing apparatus;
   b) in response to a request for displaying the predetermined kind of information being input, outputting an item of the predetermined kind of information, among said items of the predetermined kind of information, relevant to a current one of said internal states; and
   c) forming history information indicating a history of how said step b) has been performed and informing a user of said history.

2. The data processing method according to claim 1, wherein said history information includes a number of times said step b) has been performed for every item of the predetermined kind of information.

3. The data processing method according to claim 1, further comprising a step of d) in response to a list output request being input, outputting a list of said history information.

4. The data processing method according to claim 3, further comprising a step of e) in response to a request sent from another apparatus, sending said history information to said other apparatus.

5. The data processing method according to claim 4, further comprising a step of f) sending said history information to another apparatus periodically.

6. The data processing method according to claim 1, wherein said predetermined kind of information comprises help information such that a user may easily understand how to manipulate said apparatus by reading said help information.

7. The data processing method according to claim 1, wherein each of said internal states comprises a display of a respective one of items of operation guidance information.

8. The data processing method according to claim 7, wherein said history information includes a number of times said step b) has been performed for every item of the operation guidance information.

9. A data processing method comprising steps of:
   a) storing, in respective user data processing apparatuses, items of a predetermined kind of information for respective internal states;
   b) in response to a request for displaying the predetermined kind of information being input, in one of said respective user data processing apparatuses, outputting an item of the predetermined kind of information, among said items of the predetermined kind of information, relevant to a current one of said internal states;
   c) forming, in said respective user data processing apparatuses, history information indicating a history of how said step b) has been performed and informing a user of said history;
   d) collecting, in a center data processing apparatus, said history information from said respective user data processing apparatuses;

e) integrating, in said center data processing apparatus, said history information collected from said respective user data processing apparatuses;

f) storing, in said center data processing apparatus, thus-integrated history information; and g) outputting, in response to a request, said integrated history information.

10. A data processing method comprising steps of:

a) storing, in respective user data processing apparatuses, items of a predetermined kind of information for respective internal states;

b) in response to a request for displaying the predetermined kind of information being input, in one of said respective user data processing apparatuses, outputting an item of the predetermined kind of information, among said items of the predetermined kind of information, relevant to a current one of said internal states;

c) forming, in said respective user data processing apparatuses, history information indicating a history of how said step b) has been performed and informing a user of said history;

d) collecting, in a center data processing apparatus, said history information from said respective user data processing apparatuses;

e) storing, in said center data processing apparatus, said history information collected from said respective user data processing apparatuses individually for said respective user data processing apparatuses; and f) outputting, in response to a request, said history information individually for said respective user data processing apparatuses.

11. A data processing method comprising steps of:

a) storing, in respective user data processing apparatuses, items of a predetermined kind of information for respective internal states;

b) in response to a request for displaying the predetermined kind of information being input, in one of said respective user data processing apparatuses, outputting an item of the predetermined kind of information, among said items of the predetermined kind of information, relevant to a current one of said internal states;

c) forming, in said respective user data processing apparatuses, history information indicating a history of how said step b) has been performed and informing a user of said history;

d) collecting, in a center data processing apparatus, said history information from said respective user data processing apparatuses;

e) sorting, in said center data processing apparatus, said history information collected from said respective user data processing apparatuses so that an item of said history information, which item is relevant to an item of the predetermined kind of information which has been displayed more frequently, is at a higher order;

f) outputting, in response to a request, said history information having undergone said step e).

12. A data processing system comprising:

storing means for storing items of a predetermined kind of information for respective internal states of a data processing apparatus;

information displaying means for, in response to a request for displaying the predetermined kind of information being input, outputting an item of the predetermined kind of information, among said items of the predetermined kind of information, relevant to a current one of said internal states; and history forming means for forming history information indicating a history of how said information displaying means has output items of the predetermined kind of information and means for informing a user of said history.

13. A data processing system comprising:

information storing means for storing, in respective user data processing apparatuses, items of a predetermined kind of information for respective internal states;

information displaying means for, in response to a request for displaying the predetermined kind of information being input, in one of said respective user data processing apparatuses, outputting an item of the predetermined kind of information, among said items of the predetermined kind of information, relevant to a current one of said internal states;

history forming means for forming, in said respective user data processing apparatuses, history information indicating a history of how said information displaying means has output items of the predetermined kind of information and means for informing a user of said history;

collecting means for collecting, in a center data processing apparatus, said history information from said respective user data processing apparatuses;

integrating means for integrating, in said center data processing apparatus, said history information collected from said respective user data processing apparatuses;

history storing means for storing, in said center data processing apparatus, thus-integrated history information; and history outputting means for outputting, in response to a request, said integrated history information.

14. A data processing system comprising:

information storing means for storing, in respective user data processing apparatuses, items of a predetermined kind of information for respective internal states;

information displaying means for, in response to a request for displaying a predetermined kind of information being input, in one of said respective user data processing apparatuses, outputting an item of the predetermined kind of information, among said items of the predetermined kind of information, relevant to a current one of said internal states;

history forming means for forming, in said respective user data processing apparatuses, history information indicating a history of how said information displaying means has displayed items of the predetermined kind of information and means for informing a user of said history;

collecting means for collecting, in a center data processing apparatus, said history information from said respective user data processing apparatuses;

history storing means for storing, in said center data processing apparatus, said history information collected from said respective user data processing apparatuses individually for said respective user data processing apparatuses; and outputting means for outputting, in response to a request, said history information individually for said respective user data processing apparatuses.

15. A data processing system comprising:

information storing means for storing, in respective user data processing apparatuses, items of a predetermined kind of information for respective internal states;

information displaying means for, in response to a request for displaying the predetermined kind of information being input, in one of said respective user data processing apparatuses, outputting an item of the predetermined kind of information, among said items of the predetermined kind of information, relevant to a current one of said internal states;

history forming means for forming, in said respective user data processing apparatuses, history information indicating a history of how said information displaying means has displayed items of the predetermined kind of information and means for informing a user of said history;

collecting means for collecting, in a center data processing apparatus, said history information from said respective user data processing apparatuses;

sorting means for sorting, in said center data processing apparatus, said history information collected from said respective user data processing apparatuses so that an item of said history information, which item is relevant to an item of the predetermined kind of information which has been displayed more frequently, is at a higher order; and outputting means for outputting, in response to a request, said history information having undergone the sorting operation by said sorting means.

* * * * *